US008901333B2

(12) United States Patent
Tulsky et al.

(10) Patent No.: US 8,901,333 B2

(45) Date of Patent: Dec. 2, 2014

(54) NANOCRYSTALS WITH FUNCTIONAL LIGANDS

(75) Inventors: Eric Tulsky, Berkeley, CA (US); Eric Welch, Eugene, OR (US); Bruce Branchaud, Eugene, OR (US); Roman Rozhkov, Eugene, OR (US)

(73) Assignee: Life Technologies Corporation, Carlsbad, CA (US)

( * ) Notice: Subject to any disclaimer, the term of this patent is extended or adjusted under 35 U.S.C. 154(b) by 477 days.

(21) Appl. No.: 13/122,094

(22) PCT Filed: Sep. 30, 2009

(86) PCT No.: PCT/US2009/059117

§ 371 (c)(1),
(2), (4) Date: May 18, 2011

(87) PCT Pub. No.: WO2010/039897

PCT Pub. Date: Apr. 8, 2010

(65) Prior Publication Data

US 2011/0256404 A1 Oct. 20, 2011

Related U.S. Application Data

(60) Provisional application No. 61/102,693, filed on Oct. 3, 2008.

(51) Int. Cl.
*C07F 9/02* (2006.01)
*B32B 5/16* (2006.01)
*C09K 11/02* (2006.01)

(52) U.S. Cl.
CPC .................................... *C09K 11/025* (2013.01)
USPC ............................................ 556/19; 428/407

(58) Field of Classification Search
CPC ............ C07F 9/02; C07F 9/3808; B32B 5/16
USPC .................................................... 556/19, 404
See application file for complete search history.

(56) References Cited

U.S. PATENT DOCUMENTS

| | | | |
|---|---|---|---|
| 4,098,814 A | 7/1978 | Sommer et al. | |
| 4,436,899 A | 3/1984 | DiGiacomo et al. | |
| 5,332,767 A | 7/1994 | Reisser et al. | |
| 6,225,198 B1 | 5/2001 | Alivisatos et al. | |
| 7,198,847 B2 | 4/2007 | Naasani | |
| 7,205,048 B2 | 4/2007 | Naasani | |
| 2004/0007169 A1* | 1/2004 | Ohtsu et al. | 117/84 |
| 2004/0091710 A1 | 5/2004 | Bawendi et al. | |
| 2005/0266246 A1 | 12/2005 | Reiss et al. | |

FOREIGN PATENT DOCUMENTS

| | | |
|---|---|---|
| DE | 2732777 B1 | 1/1979 |
| WO | WO-97/39004 A1 | 10/1997 |
| WO | WO-03/030227 A2 | 4/2003 |
| WO | WO-2006/025627 | 3/2006 |
| WO | WO-2010/039897 | 4/2010 |
| WO | WO-2010/039897 A3 | 4/2010 |

OTHER PUBLICATIONS

Barrett, A. , "3-Butenyl Esters as Convenient Protecting Groups for Carboxylic Acids", *Tetrahedron Letters*, vol. 30, No. 52, 1989, pp. 7317-7320.

Potapova, I. et al., "Semiconductor Nanocrystals with Multifunctional Polymer Ligands", *Journal of the American Chemical Society*, vol. 125, No. 2, 2002, pp. 320-321.

Dabbousi, B., et al. "(CDSE)ZnS Core- Shell Quantum Dots: Synthesis and Characterization of a Size Series of Highly Luminescent Nanocrystallites", *Journal of Physical Chemistry*; vol. 101, Nov. 1997, 9463-9475.

Hines, M. et al. "Synthesis and Characterization of Strongly Luminescing ZnS-Capped CdSe Nanocrystals", *J. Phys. Chem.* vol. 100, No. 2, 1996 , 468-471.

Kuno, M., et al. "The band edge luminescence of surface modified CdSe nanocrystallites: Probing the luminescing state", *Journal of Chemical Physics* vol. 106, No. 23, 1997, 9869-9882.

Medintz, I., et al. "Self-assembled nanoscale biosensors based on quantum dot Fret donors", *Nature Materials* vol. 2, Aug. 2003 , 630-638.

Patolsky, F., et al. "Lighting up the dynamics of telomerization and DNA replication by CdSe-ZnS Quantum Dots", *J. Am. Chem. Soc.* vol. 125, No. 46 Apr. 2003, 13918-13919.

International Search Report for PCT Application No. PCT/US2009/059117 Mailed Apr. 29, 2010.

Peng, X., et al. "Epitaxial Growth of Highly Luminescent CdSe/CdS Core/Shell Nanocrystals with Photostability and Electronic Accessibility", *J. Am. Chem. Soc.* vol. 119, No. 30, 1997, 7019-7029.

Piston, D., et al. "Fluorescent protein FRET: the good, the bad and the ugly", *Trends Biochem. Sci.*, vol. 32, No. 9, 2007, 407-414.

Susumu, K. "Enhancing the Stability and Biological Functionalities of Quantum Dots via Compact Multifunctional Ligands", *Journal of the American Chemical Society*, vol. 129, No. 45, 2007, 13987-13996.

Willard, D., et al. "CdSe-ZnS Quantum Dots as Resonance Energy Transfer Donors in a Model Protein-Protein Binding Assay", *Nano Letters* vol. 1, No. 9 Jun. 2001 , 469-474.

Zhang, C., et al. "Single-quantum-dot-based DNA nanosensor", *Nature Materials* vol. 4, Oct. 2005 , 826-831.

2344417, , "European Search Report mailed May 31, 2012", pp. 1-18.

CID 10878411—Compound Summary, XP55028042, Retrieved from internet: URL:http://pubchem.ncbi.nlm.nih.gov/summary/summary.cgi?cid=10878411 [retrieved on May 24, 2012], Oct. 26, 2006.

PCT/US2009/059117, International Preliminary Report on Patentability Mailed Apr. 14, 2011.

Greene, T.W. et al., "Protection for the Carboxyl Group", *Protective Groups in Organic Synthesis*, 2002, pp. 369-452.

Wuts, Peter G. et al., "Greene's Protective Groups in Organic Synthesis", *4th Edition*, Wiley- Interscience, 2006, 8 pgs.

* cited by examiner

*Primary Examiner* — Sudhakar Katakam
*Assistant Examiner* — Kofi Adzamli
(74) *Attorney, Agent, or Firm* — Life Technologies Corporation

(57) ABSTRACT

Coated fluorescent semiconductor nanoparticles having an organic surface layer of multi-functional surface ligands that include a nanocrystal binding center and one or more covalently attached functional groups or reactive functional groups are described as well as water-dispersible nanoparticles having an organic surface layer or multi-functional surface ligands and methods for the preparation and use of such coated nanoparticles.

18 Claims, No Drawings

NANOCRYSTALS WITH FUNCTIONAL LIGANDS

CROSS REFERENCE

This application is a national stage filing of International Application No. PCT/US2009/059117, filed Sep. 30, 2009, which claims priority to U.S. Provisional Application No. 61/102,693, filed Oct. 3, 2008; which disclosures are hereby incorporated by reference in their entirety.

BACKGROUND

Semiconductor nanocrystals are widely used in the study of biochemical and biological systems. Semiconductor nanocrystals can be excited over a wide spectrum of wavelengths and display intense luminescent emission over an extremely narrow bandwidth that is dependent on nanocrystal size and composition. Nanocrystals can also be made insensitive to their medium or environment. These properties allow semiconductor nanocrystals to be used as ultrasensitive luminescent reporters of biological states and processes in many systems.

Semiconductor nanocrystals may be made using techniques known in the art. These methods typically produce nanocrystals having a coating of hydrophobic ligands, such as on their surfaces. Because the surface of the nanocrystal has many binding sites for such ligands, the typical process results in coating of the exposed surface of the nanocrystal with a layer of alkyl groups at the outer surface, and produces a nanocrystal with a surface that is hydrophobic, i.e., incompatible with water.

High temperature pyrolysis gives the synthetic chemist a substantial degree of control over the size of the particles prepared. One disadvantage of this method, however, is that the particles are sequestered in reverse micelles of coordinated, hydrophobic coating of surfactant molecules, such as, for example, trioctyl phosphine (TOP), trioctyl phosphine oxide (TOPO), or tetradecylphosphonic acid (TDPA). While this surfactant layer helps to protect and stabilize the nanocrystal from rapid degradation, they are only dispersible in organic solvents such as chloroform, dichloromethane, hexane, toluene, and pyridine. This is problematic insofar as many applications rely on the fluorescence emission of the semiconductor nanocrystals and require that the nanocrystals be water soluble or water dispersible. In particular, for biological applications, nanocrystals that are soluble or dispersible in water are desirable. Therefore, it may be necessary to make the surface of the nanocrystal, which is typically coated with hydrophobic ligands, compatible with water or biological media.

Although some methods for rendering semiconductor nanocrystals water dispersible have been reported, they are problematic insofar as the treated semiconductor nanocrystals suffer from significant disadvantages that limit their wide applicability. For example, a $Cd(OH)_2$-capped CdS sol exhibits photoluminescent properties that are pH dependent. The sol could be prepared only in a very narrow pH range (pH 8-10) and exhibited a narrow fluorescence band only at a pH of greater than 10. Such pH dependency greatly limits the usefulness of the material; in particular, it is not appropriate for use in biological systems. Other groups have replaced the organic passivating layer of the semiconductor nanocrystal with water-soluble moieties; however, the resultant derivatized semiconductor nanocrystals often exhibit a loss in luminescence. For example, short chain thiols such as 2-mercaptoethanol and 1-thio-glycerol have been used as stabilizers in the preparation of water-soluble CdTe nanocrystals, but the resulting coated semiconductor nanocrystals were not stable and photoluminescent properties degraded with time. Other more exotic capping compounds such as deoxyribonucleic acid (DNA) have been reported with similar results. In addition, subjecting coated nanoparticles to ligand exchange typically results in nanoparticles having a lower quantum yield and lower colloidal stability than the coated nanoparticles prior to ligand exchange, and incomplete ligand exchange can cause batch-to-batch variability.

SUMMARY

Various embodiments described herein are directed to methods for preparing a nanoparticle including the steps of admixing one or more first nanocrystal precursors and one or more multi-functional ligands of general Formula I:

$$(X)_n\text{-}(L\text{-}R)_y \qquad \text{I}$$

wherein: each X is independently a nanocrystal binding center selected from phosphonic acid, phosphinic acid, phosphine, phosphine oxide, carboxylic acid, amine, imidazole, thiol, mercaptan, sulfonate, and selenate; each L is independently a linker selected from a covalent bond, saturated or unsaturated aliphatic chain of from 2 to about 500 carbon atoms, polyethylene glycol having from 2 to about 500 carbon atoms, or polyester having from 2 to about 100 carbon atoms; each R independently is hydrogen or a functional group selected from halide, hydroxyl, carboxylic acid, carboxylic acid ester, ester, succinimidyl ester, alkyl ester, benzyl ester, aldehyde, amine including primary, secondary, or tertiary amine, polyamine, thiol, isocyanate, cycloalkyl, heterocycloalkyl, benzyl, aryl, heteroaryl, alkaryl, heterocycle, imidazole, pyridone, tetrazole, cyano, cyanoalkyl, thiol, thioalkyl, alkoxy, thioalkoxy, ether, alkyl ether, thioether, polyether, carbamates, azide, silyl, silyl ester, a polyethylene glycol moiety having from 2 to about 500 carbon atoms, a polyester having from 2 to about 20 carbon atoms, and combinations thereof; and y and n are independently 1 to 3 with the proviso that when y is 1, R is not hydrogen and when y is 2 or 3, at least one R is not hydrogen; in a solvent to form a mixture; and heating the mixture.

In some embodiments, the solvent may be hydrocarbons, amines, phosphines, carboxylic acids, phosphine oxides, alkylphosphonic acids, and mixtures thereof, and in particular embodiments, the solvent may be octadecene, tri-n-octylphosphine oxide (TOPO), tri-n-octylphosphine (TOP), decylamine, octadecane, dioctylamine, tributylphosphine, oleylamine, oleic acid, and mixtures thereof. In other embodiments, the heating may include heating the mixture to about 200° C. to about 350° C., and in certain embodiments, the step of heating may be carried out for from about 30 minutes to about 48 hours.

In some embodiments, the method may further include the step of adding one or more second precursor to the mixture after heating and continuing heating to produce core/shell nanoparticles. In other embodiments, the mixture may further include core nanocrystals, and the method results in core/shell nanoparticles.

In some embodiments, y can be 1 and X can be phosphonic acid or carboxylic acid, and in other embodiments, y can be 2 and X can be phosphinic acid. In some embodiments, L can include an aliphatic chain such as, but not limited to, $C_4$-$C_{18}$ alkyl, $C_4$-$C_{18}$ alkenyl and $C_4$-$C_{18}$ alkynyl, and in particular embodiments, L can include $C_{11}$-$C_{16}$ alkyl. In other embodiments, L can include a polyethylene glycol (PEG) such as, but not limited to, PEG-2, PEG-4, PEG-6, PEG-8, PEG-12, PEG- 20, and PEG-24, and in certain embodiments, L can include an aliphatic chain such as, but not limited to, $C_2$-$C_{10}$ alkyl, $C_2$-$C_{10}$ alkenyl, and $C_2$-$C_{10}$ alkynyl covalently attached to a polyethylene glycol or polyester.

In some embodiments, R can include one or more functional groups such as, for example,

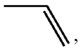, , , —OH,

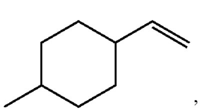, 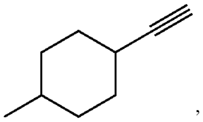,

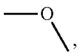, 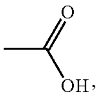, 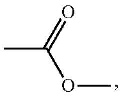, 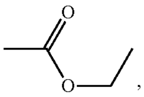,

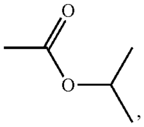, 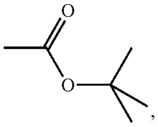,

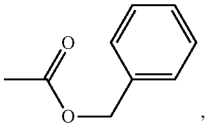, 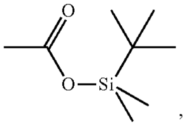,

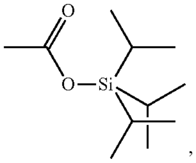, 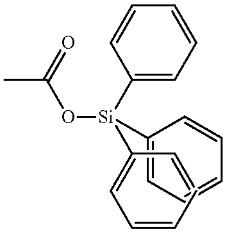,

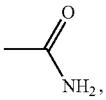, 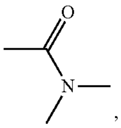, 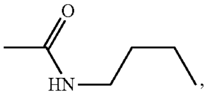,

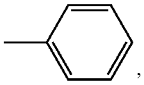, 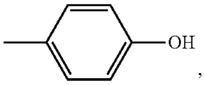,

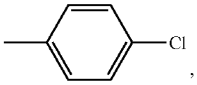, 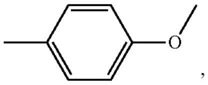,

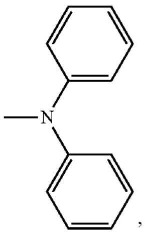, 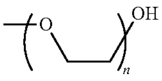, and

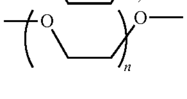

wherein each n is from 1 to 100. In other embodiments, each R may independently be hydrogen or a functional group such as alkenyl or alkynyl. In still other embodiments, the method may further include the step of reacting an alkenyl or alkynyl to form functionalized ends in a subsequent functionalization reaction, and in particular embodiments, the method may further include the step of crosslinking the functionalized ends in a subsequent crosslinking reaction.

Various other embodiments are directed to nanoparticles having a coating, said coating comprising one or more multi-functional ligands of Formula I:

$$(X)_n\text{-}(L\text{-}R)_y \qquad \text{I}$$

wherein each X is independently a nanocrystal binding center selected from phosphonic acid, phosphinic acid, phosphine, phosphine oxide, carboxylic acid, amine, imidazole, thiol, mercaptan, sulfonate, and selenate; each L is independently a linker selected from a covalent bond, saturated or unsaturated aliphatic chain of from 2 to about 500 carbon atoms, polyethylene glycol having from 2 to about 500 carbon atoms, or polyester having from 2 to about 100 carbon atoms; each R independently is hydrogen or a functional group selected from halide, hydroxyl, carboxylic acid, carboxylic acid ester, ester, succinimidyl ester, alkyl ester, benzyl ester, aldehyde, amine including primary, secondary, or tertiary amine, polyamine, thiol, isocyanate, cycloalkyl, heterocycloalkyl, benzyl, aryl, heteroaryl, alkaryl, heterocycle, imidazole, pyridone, tetrazole, cyano, cyanoalkyl, thiol, thioalkyl, alkoxy, thioalkoxy, ether, alkyl ether, thioether, polyether, carbamates, azide, silyl, silyl ester, a and combinations thereof; and y and n are independently 1 to 3 with the proviso that when y is 1, R is not hydrogen and when y is 2 or 3, at least one R is not hydrogen.

In some embodiments, y can be 1 and X can be phosphonic acid or carboxylic acid, and in other embodiments, y can be 2 and X can be phosphinic acid. In some embodiments, L can include an aliphatic chain such as, but not limited to, $C_4$-$C_{18}$ alkyl, $C_4$-$C_{18}$ alkenyl and $C_4$-$C_{18}$ alkynyl, and in particular embodiments, L can include $C_{11}$-$C_{16}$ alkyl. In other embodiments, L can include a polyethylene glycol (PEG) such as, but not limited to, PEG-2, PEG-4, PEG-6, PEG-8, PEG-12, PEG-20, and PEG-24, and in certain embodiments, L can include an aliphatic chain such as, for example, $C_2$-$C_{10}$ alkyl, $C_2$-$C_{10}$ alkenyl, and $C_2$-$C_{10}$ alkynyl covalently attached to a polyethylene glycol or polyester.

In some embodiments, each R can independently include one or more functional groups such as, for example,

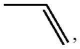, , , —OH,

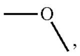, 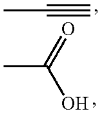, 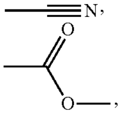, 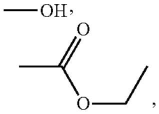,

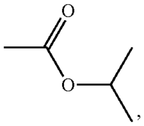, 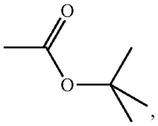,

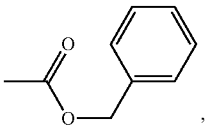, 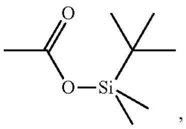,

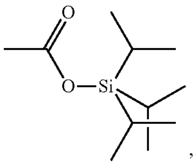, 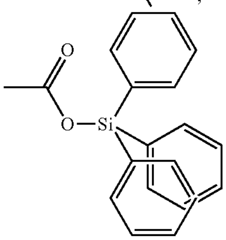,

-continued

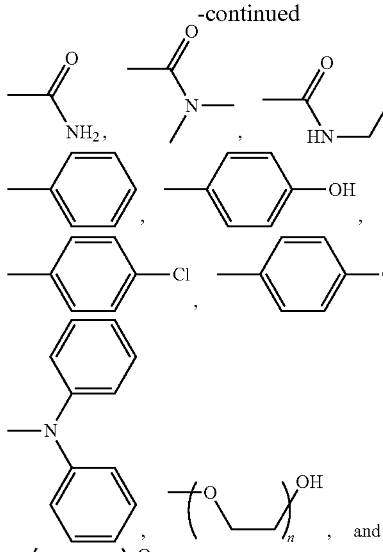

and

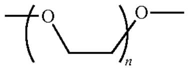

wherein each n is 1 to 100. In particular embodiments, R can include two or more functional groups covalently linked by one or more alkyl or alkenyl having from 1 to 6 carbons. In certain embodiments, each of the one or more multi-functional ligands independently can be bi-functional phosphonates of Formula II:

II

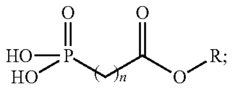

or Formula III:

III

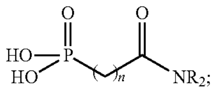

and Formula IV:

IV

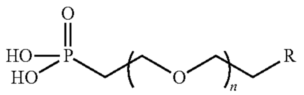

wherein each n is 1 to 100; and each R is independently selected from hydrogen, hydroxyl, carboxylic acid, $C_1$-$C_4$ alkoxy, alkyl, benzyl, amine, polyamine, thiol, isocyanate, substituted or unsubstituted aryl, alkaryl, cycloalkyl, heterocycle, cyano, cyanoalkyl, thiol, thioalkyl, alkoxy, thioalkoxy, ether, alkyl ether, ester, succinimidyl, succinimidyl ester, thioether, azide, silyl ester or silyl of formula $SiR'_3$, wherein each R' is independently $C_1$-$C_4$ alkyl or substituted or unsubstituted aryl and combinations thereof. In other embodiments, each of the one or more multi-functional ligands independently may be bi-functional phosphonates of Formula V:

V

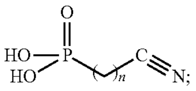

Formula VI:

VI

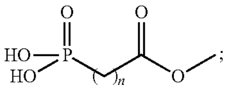

Formula VII:

VII

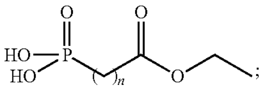

Formula VIII:

VIII

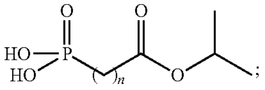

Formula IX:

IX

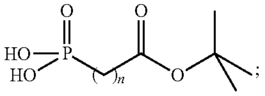

Formula X:

X

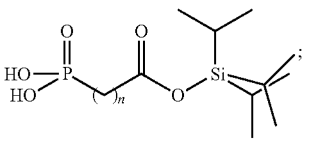

Formula XI:

XI

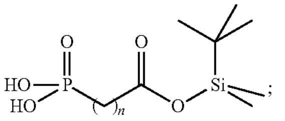

Formula XIV:

XIV

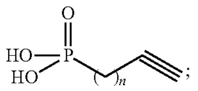

Formula XV:

XV

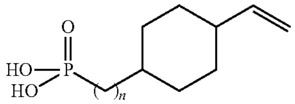

Formula XVI:

XVI

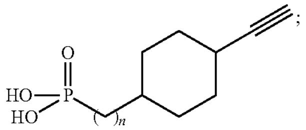

and Formula XVII:

XVII

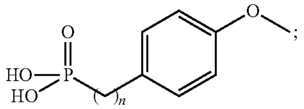

wherein each n is 1 to 100. In still other embodiments, each of the one or more multi-functional ligands independently may be bi-functional phosphonates of Formula XII:

XII

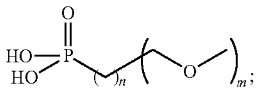

Formula XIII:

XIII

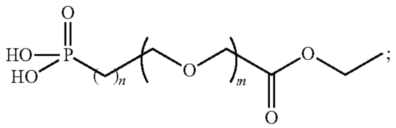

and Formula XVIII:

XVIII

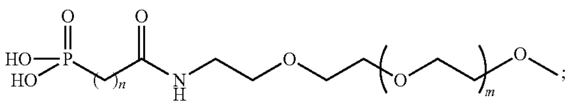

wherein each m and n are independently 1 to 100. In yet other embodiments, each of the one or more multi-functional ligands independently can be bi-functional carbonates of Formula IIa:

IIa

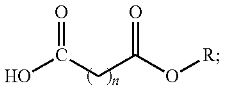

Formula IIIa:

IIIa

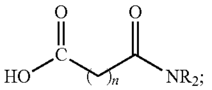

and Formula IVa:

IVa

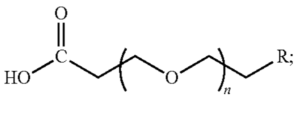

wherein each n is 1 to 100; and each R is independently selected from hydrogen, hydroxyl, carboxylic acid, $C_1$-$C_4$ alkoxy, alkyl, benzyl, amine, polyamine, thiol, isocyanate, substituted or unsubstituted aryl, alkaryl, cycloalkyl, heterocycle, cyano, cyanoalkyl, thiol, thioalkyl, alkoxy, thioalkoxy, ether, alkyl ether, ester, succinimidyl, succinimidyl ester, thioether, azide, silyl ester or silyl of formula $SiR'_3$, wherein each R' is independently $C_1$-$C_4$ alkyl or substituted or unsubstituted aryl and combinations thereof. In further embodiments, each of the one or more multi-functional ligands independently can be bi-functional carbonates of Formula Va:

Va

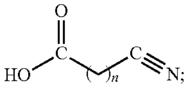

Formula VIa:

VIa

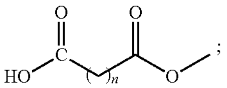

Formula VIIa:

VIIa

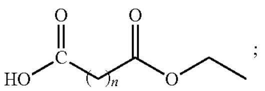

Formula VIIIa:

VIIIa

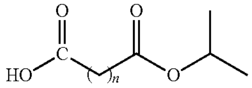

;

Formula IXa:

IXa

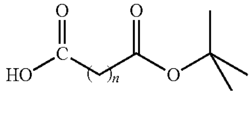

;

Formula Xa:

Xa

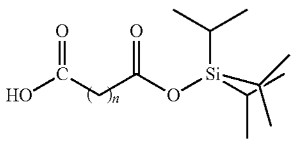

;

Formula XIa:

XIa

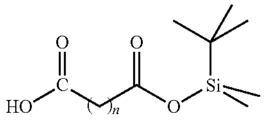

;

Formula XIVa:

XIVa

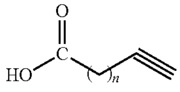

;

Formula XVa:

XVa

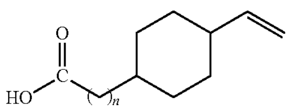

;

Formula XVIa:

XVIa

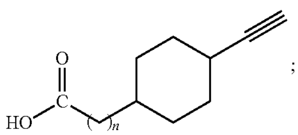

;

and Formula XVIIa:

XVIIa

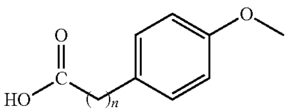

;

wherein each n is 1 to 100, and in yet further embodiments, each of the one or more multi-functional ligands independently can be bi-functional carbonates of Formula XIIa:

XIIa

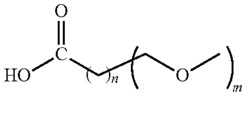

;

Formula XIIIa:

XIIIa

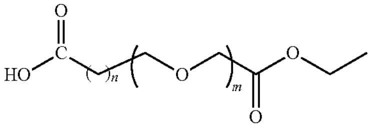

;

and Formula XVIIIa:

XVIIIa

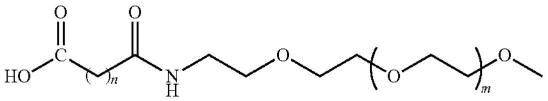

;

wherein each m and n are independently 1 to 100.

In some embodiments, each of the one or more multi-functional ligands independently can be a tri-functional phosphinate of Formula XIX:

XIX

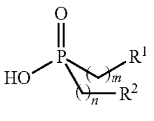

wherein each m and n are independently 1 to 100; and each $R^1$ and $R^2$ are independently selected from hydrogen, hydroxyl, carboxylic acid, carboxylic acid ester, ester, succinimidyl ester, alkyl ester, benzyl ester, aldehyde, amine, polyamine, thiol, isocyanate, benzyl, substituted or unsubstituted aryl, alkaryl, cycloalkyl, heterocycle, cyano, cyanoalkyl, thiol, thioalkyl, alkoxy, thioalkoxy, ether, alkyl ether, thioether, polyether, silyl or silyl ester of formula, $SiR'_3$, wherein each R' is independently hydrogen, $C_1$-$C_4$ alkyl or substituted or unsubstituted aryl, and at least one of $R^1$ or $R^2$ is not hydrogen. In other embodiments, each of the one or more multi-functional ligands can independently be a tri-functional phosphinate of Formula XX:

XX

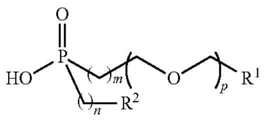

wherein each m, n, and p are independently 1 to 100; and each $R^1$ and $R^2$ are independently selected from hydrogen, hydroxyl, carboxylic acid, carboxylic acid ester, ester, succinimidyl ester, alkyl ester, benzyl ester, aldehyde, amine, polyamine, thiol, isocyanate, benzyl, substituted or unsubstituted aryl, alkaryl, cycloalkyl, heterocycle, cyano, cyanoalkyl, thiol, thioalkyl, alkoxy, thioalkoxy, ether, alkyl ether, thioether, polyether, silyl or silyl ester of formula, $SiR'_3$, wherein each R' is independently hydrogen, $C_1$-$C_4$ alkyl or substituted or unsubstituted aryl, and at least one of $R^1$ or $R^2$ is not hydrogen. In still other embodiments, each of the one or more multi-functional ligands can independently be a tri-functional phosphinate of Formula XXI:

XXI

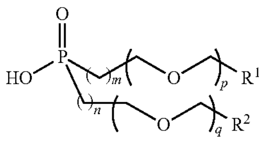

wherein each m, n, p, and q are independently 1 to 100; and each $R^1$ and $R^2$ are independently selected from hydrogen, hydroxyl, carboxylic acid, carboxylic acid ester, ester, succinimidyl ester, alkyl ester, benzyl ester, aldehyde, amine, polyamine, thiol, isocyanate, benzyl, substituted or unsubstituted aryl, alkaryl, cycloalkyl, heterocycle, cyano, cyanoalkyl, thiol, thioalkyl, alkoxy, thioalkoxy, ether, alkyl ether, thioether, polyether, silyl or silyl ester of formula, $SiR'_3$, wherein each R' is independently hydrogen, $C_1$-$C_4$ alkyl or substituted or unsubstituted aryl, and at least one of $R^1$ or $R^2$ is not hydrogen, and in yet other embodiments, each of the one or more multi-functional ligands can independently be a tri-functional phosphinate of Formula XXII:

XXII

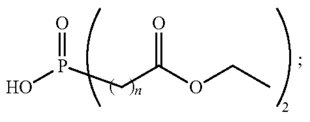

Formula XXIII:

XXIII

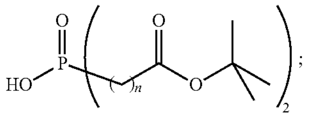

Formula XXIV:

XXIV

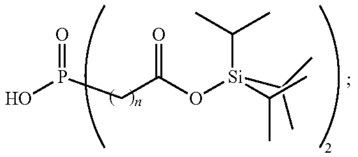

Formula XXVII:

XXVII

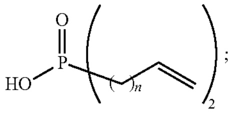

Formula XXVIII:

XXVIII

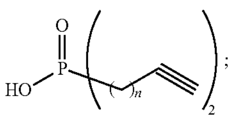

and Formula XXIX:

XXIX

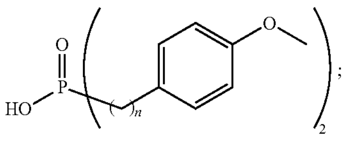

wherein each n is independently 1 to 100. In further embodiments, each of the one or more multi-functional ligands can independently be a tri-functional phosphonate of Formula XXV:

XXV

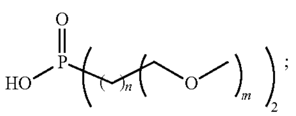

Formula XXVI:

XXVI

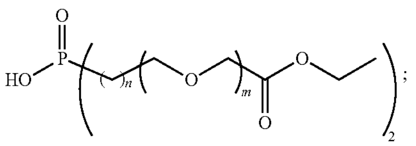

and Formula XXXI:

XXXI

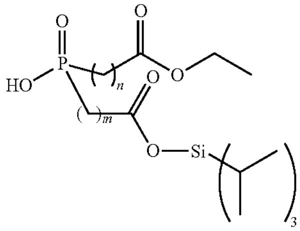
;

wherein each m and n are independently 1 to 100, and in still further embodiments, each of the one or more multi-functional ligands can independently be tri-functional phosphinates of Formula XXX:

XXX

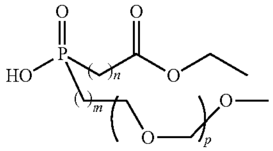
;

wherein each m, n, and p are independently 1 to 100.

In certain embodiments, each of the one or more multi-functional ligands can independently be:

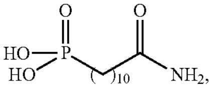, 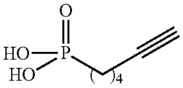,

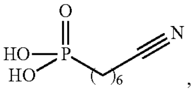, 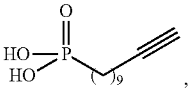,

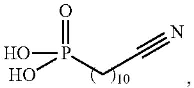, 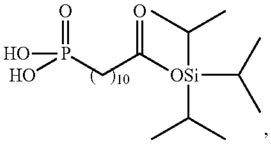,

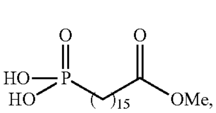, 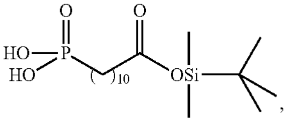,

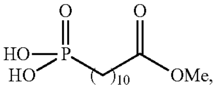, 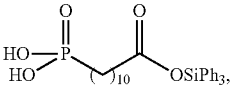,

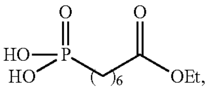, 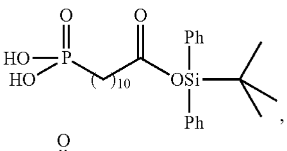,

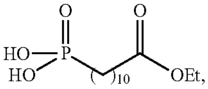, 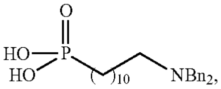,

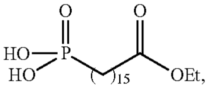, 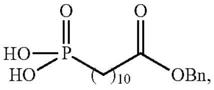,

-continued

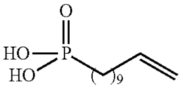,

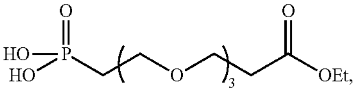,

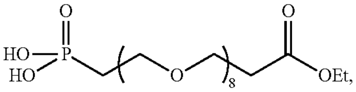,

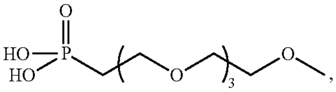,

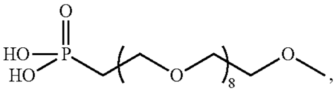,

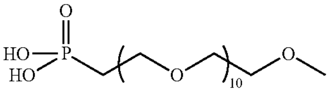,

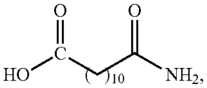, 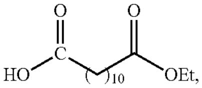,

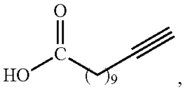,

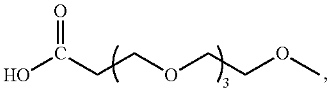,

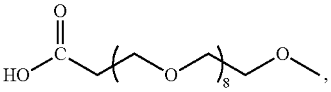,

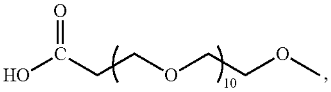,

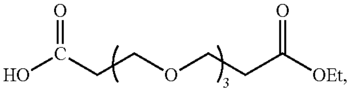,

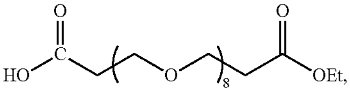,

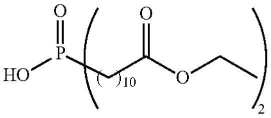, 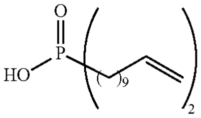,

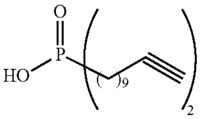, 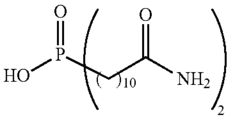,

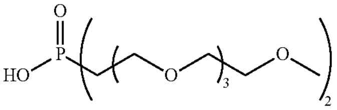,

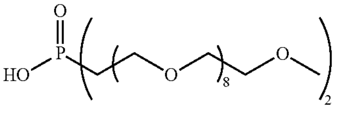,

-continued

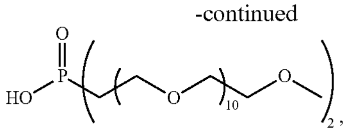,

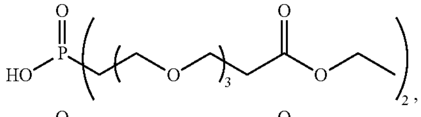,

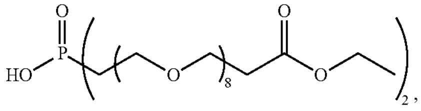,

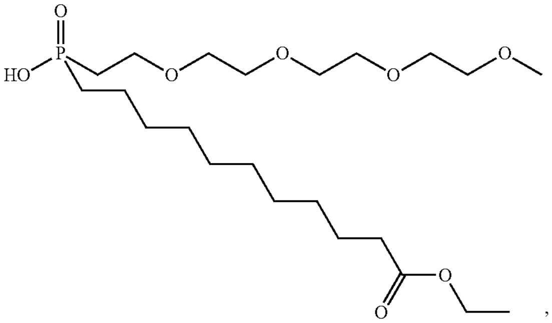,

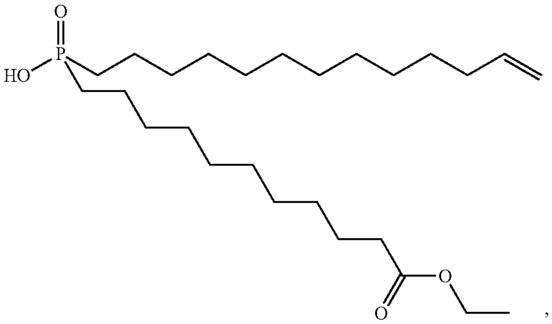,

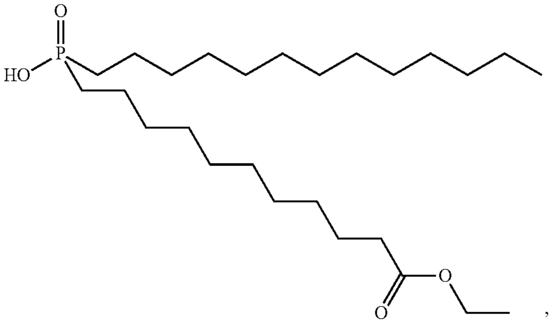, and the like or derivatives thereof.

In particular embodiments, each R can independently be hydrogen or a functional group selected from an alkenyl or an alkynyl. In some embodiments, each alkenyl or alkynyl can be utilized in a subsequent reaction to form functionalized ends, and in certain embodiments, each of the functionalized ends may be further utilized in a subsequent crosslinking reaction.

DETAILED DESCRIPTION

Embodiments disclosed herein may be understood more readily by reference to the following detailed description and Examples. It is to be understood that the terminology used is for the purpose of describing specific embodiments only and is not intended to be limiting.

Unless defined otherwise, all technical and scientific terms have the same meaning as is commonly understood by one of ordinary skill in the art to which the embodiments disclosed belongs.

As used herein, “a” or “an” means “at least one” or “one or more.”

As used herein, “about” means that the numerical value is approximate and small variations would not significantly affect the practice of the disclosed embodiments. Where a numerical limitation is used, unless indicated otherwise by the context, “about” means the numerical value can vary by ±10% and remain within the scope of the disclosed embodiments.

The term “alkenyl” is used herein to mean a straight or branched chain radical of 2-20 carbon atoms, unless the chain length is otherwise limited, wherein there is at least one double bond between two of the carbon atoms in the chain, including, but not limited to, ethenyl, 1-propenyl, 2-propenyl, 2-methyl-1-propenyl, 1-butenyl, 2-butenyl, and the like. Preferably, the alkenyl chain is 2 to 8 carbon atoms in length, most preferably from 2 to 4 carbon atoms in length.

The term “alkyl” as employed herein by itself or as part of another group refers to both straight and branched chain radicals of up to 20 carbons or more, up to 30 carbons or more, or up to 100 carbons or more, unless the chain length is otherwise limited, such as methyl, ethyl, propyl, isopropyl, butyl, s-butyl, t-butyl, isobutyl, pentyl, hexyl, isohexyl, heptyl, 4,4-dimethylpentyl, octyl, 2,2,4-trimethylpentyl, nonyl, or decyl.

The term “alkynyl” is used herein to mean a straight or branched chain radical of 2-20 carbon atoms, unless the chain length is otherwise limited, wherein there is at least one triple bond between two of the carbon atoms in the chain, including, but not limited to, ethynyl, 1-propynyl, 2-propynyl, and the like. Preferably, the alkynyl chain is 2 to 8 carbon atoms in length, most preferably from 2 to 4 carbon atoms in length.

In all instances herein where there is an alkenyl or alkynyl moiety as a substituent group, the unsaturated linkage, i.e., the vinyl or ethenyl linkage, is preferably not directly attached to a nitrogen, oxygen or sulfur moiety.

The term “alkoxy” or “alkyloxy” refers to any of the above alkyl groups linked to an oxygen atom. Typical examples are methoxy, ethoxy, isopropyloxy, sec-butyloxy, and t-butyloxy.

The term “aralkyl” or “arylalkyl” as employed herein by itself or as part of another group refers to $C_{1-6}$ alkyl groups as discussed above having an aryl substituent, such as benzyl, phenylethyl or 2-naphthylmethyl.

The term “aryl” as employed herein by itself or as part of another group refers to monocyclic or bicyclic aromatic groups containing from 6 to 12 carbons in the ring portion, preferably 6-10 carbons in the ring portion. Typical examples include phenyl, biphenyl, naphthyl or tetrahydronaphthyl.

The terms “attached” or “operably bound” as used herein interchangeably to refer to formation of a covalent bond or a non-covalent association between a combination of two or more molecules, of sufficient stability for the purposes of use in detection systems as described herein and standard conditions associated therewith as known in the art. The attachment may comprise, but is not limited to, one or more of a covalent bond, an ionic bond, a hydrogen bond, or a van der Waals interaction.

The term “carboxyalkyl” as employed herein refers to any of the above alkyl groups wherein one or more hydrogens thereof are substituted by one or more carboxylic acid moieties.

A “core nanocrystal” is understood to mean a nanocrystal to which no shell has been applied; typically it is a semiconductor nanocrystal. A core nanocrystal can have a homogenous composition or its composition can vary with depth inside the nanocrystal. Many types of nanocrystals are known, and methods for making a core nanocrystal and applying a shell to a core nanocrystal are known in the art. The shell-forming methods described herein are applicable for producing a shell on core nanocrystals. To distinguish a nanocrystal used in disclosed embodiments from one that might be formed unintentionally in a shell-forming step, the nanocrystal introduced into a reaction mixture is referred to as a primary nanocrystal, regardless of whether it is a core nanocrystal or a core/shell nanocrystal. In either event, the methods disclosed herein produce a new shell on the outer surface of the primary nanocrystal.

As used in the claims and specification, the words "comprising" (and any form of comprising, such as "comprise" and "comprises" and "comprised"), "having" (and any form of having, such as "have" and "has"), "including" (and any form of including, such as "includes" and "include"), or "containing" (and any form of containing, such as "contains" and "contain"), are inclusive or open-ended and do not exclude additional, unrecited elements or method steps.

The term "cycloalkyl" as employed herein by itself or as part of another group refers to cycloalkyl groups containing 3 to 9 carbon atoms. Typical examples are cyclopropyl, cyclobutyl, cyclopentyl, cyclohexyl, cycloheptyl, cyclooctyl and cyclononyl.

The term "cycloalkylalkyl" or "cycloalkyl(alkyl)" as employed herein, by itself or as part of another group, refers to a cycloalkyl group attached to an alkyl group. Typical examples are 2-cyclopentylethyl, cyclohexylmethyl, cyclopentylmethyl, 3-cyclohexyl-n-propyl, and 5-cyclobutyl-n-pentyl.

The term "cycloalkenyl" as employed herein, by itself or as part of another group, refers to cycloalkenyl groups containing 3 to 9 carbon atoms and 1 to 3 carbon-carbon double bonds. Typical examples include cyclopropenyl, cyclobutenyl, cyclopentenyl, cyclohexenyl, cyclohexadienyl, cycloheptenyl, cycloheptadienyl, cyclooctenyl, cyclooctadienyl, cyclooctatrienyl, cyclononenyl, and cyclononadienyl.

The term "dialkylamine" or "dialkylamino" as employed herein by itself or as part of another group refers to the group $NH_2$ wherein both hydrogens have been replaced by alkyl groups, as defined above.

The term "haloalkyl" as employed herein refers to any of the above alkyl groups wherein one or more hydrogens thereof are substituted by one or more halo moieties. Typical examples include fluoromethyl, difluoromethyl, trifluoromethyl, trichloroethyl, trifluoroethyl, fluoropropyl, and bromobutyl.

The term "halogen" or "halo" as employed herein by itself or as part of another group refers to chlorine, bromine, fluorine or iodine.

The term "heterocycle" may refer to a "heteroaryl." "Heteroaryl" as employed herein refers to groups having 5 to 14 ring atoms; 6, 10 or 14 pi electrons shared in a cyclic array; and containing carbon atoms and 1, 2, 3, or 4 oxygen, nitrogen or sulfur heteroatoms (where examples of heteroaryl groups are: thienyl, benzo[b]thienyl, naphtho[2,3-b]thienyl, thianthrenyl, furyl, pyranyl, isobenzofuranyl, benzoxazolyl, chromenyl, xanthenyl, phenoxathiinyl, 2H-pyrrolyl, pyrrolyl, imidazolyl, pyrazolyl, pyridyl, pyrazinyl, pyrimidinyl, pyridazinyl, indolizinyl, isoindolyl, 3H-indolyl, indolyl, indazolyl, purinyl, 4H-quinolizinyl, isoquinolyl, quinolyl, phthalazinyl, naphthyridinyl, quinazolinyl, cinnolinyl, pteridinyl, 4αH-carbazolyl, carbazolyl, β-carbolinyl, phenanthridinyl, acridinyl, perimidinyl, phenanthrolinyl, phenazinyl, isothiazolyl, phenothiazinyl, isoxazolyl, furazanyl, phenoxazinyl, and tetrazolyl groups).

The terms "heteroarylalkyl" or "heteroaralkyl" as employed herein both refer to a heteroaryl group attached to an alkyl group. Typical examples include 2-(3-pyridyl)ethyl, 3-(2-furyl)-n-propyl, 3-(3-thienyl)-n-propyl, and 4-(1-isoquinolinyl)-n-butyl.

The term "heteroatom" is used herein to mean an oxygen atom ("O"), a sulfur atom ("S") or a nitrogen atom ("N"). It will be recognized that when the heteroatom is nitrogen, it may form an $NR^aR^b$ moiety, wherein $R^a$ and $R^b$ are, independently from one another, hydrogen or $C_1$ to $C_8$ alkyl, or together with the nitrogen to which they are bound form a saturated or unsaturated 5-, 6-, or 7-membered ring.

The term "heterocycle" may also refer to a "heterocycloalkyl." "Heterocycloalkyls" as used herein may refer to any saturated or partially unsaturated heterocycle. By itself or as part of another group, "heterocycle" may refer to a saturated or partially unsaturated ring system having 5 to 14 ring atoms selected from carbon atoms and 1, 2, 3, or 4 oxygen, nitrogen, or sulfur heteroatoms. Typical saturated examples include pyrrolidinyl, imidazolidinyl, pyrazolidinyl, tetrahydrofuranyl, tetrahydropyranyl, piperidyl, piperazinyl, quinuclidinyl, morpholinyl, and dioxacyclohexyl. Typical partially unsaturated examples include pyrrolinyl, imidazolinyl, pyrazolinyl, dihydropyridinyl, tetrahydropyridinyl, and dihydropyranyl. Either of these systems can be fused to a benzene ring. When a substituent is oxo (i.e., =O), then 2 hydrogens on the atom are replaced. When aromatic moieties are substituted by an oxo group, the aromatic ring is replaced by the corresponding partially unsaturated ring. For example a pyridyl group substituted by oxo results in a pyridone.

The terms "hydroxyl" and "hydroxyl" are used interchangeably to refer to the radical —OH.

The term "hydroxyalkyl" as employed herein refers to any of the above alkyl groups wherein one or more hydrogens thereof are substituted by one or more hydroxyl moieties.

The term "monoalkylamine" or "monoalkylamino" as employed herein by itself or as part of another group refers to the group $NH_2$ wherein one hydrogen has been replaced by an alkyl group, as defined above.

"Monodisperse" as used herein refers to a population of particles (e.g., a colloidal system) wherein the particles have substantially identical size and shape. For the purpose of the present invention, a "monodisperse" population of particles means that at least about 60% of the particles, preferably about 75% to about 90% of the particles, fall within a specified particle size range.

"Optional" or "optionally" may be taken to mean that the subsequently described structure, event or circumstance may or may not occur, and that the description includes instances where the event occurs and instances where it does not.

The phrase "substituted" when not explicitly defined refers to a group or groups being substituted with one or more substituents independently selected from the group consisting of hydroxy, nitro, trifluoromethyl, halogen, $C_{1-6}$ alkyl, $C_{1-6}$ haloalkyl, $C_{1-6}$ alkoxy, $C_{1-6}$ alkylenedioxy, $C_{1-6}$ aminoalkyl, $C_{1-6}$ hydroxyalkyl, $C_{2-4}$ alkenyl, $C_{2-4}$ alkynyl, $C_{6-10}$ aryl, phenoxy, benzyloxy, 5-10 membered heteroaryl, $C_{1-6}$ aminoalkoxy, amino, mono($C_{1-4}$)alkylamino, di($C_{1-4}$)alkylamino, $C_{2-6}$ alkylcarbonylamino, $C_{2-6}$ alkoxycarbonylamino, $C_{2-6}$ alkoxycarbonyl, $C_{2-6}$ alkoxycarbonylalkyl, carboxy, $C_{2-6}$ hydroxyalkoxy, ($C_{1-6}$)alkoxy($C_{2-6}$)alkoxy, mono ($C_{1-4}$)alkylamino($C_{2-6}$)alkoxy, di($C_{1-4}$)alkylamino($C_{2-6}$) alkoxy $C_{2-10}$ mono(carboxyalkyl)amino, bis($C_{2-10}$ carboxyalkyl)amino, $C_{2-6}$ carboxyalkoxy, $C_{2-6}$ carboxyalkyl, carboxyalkylamino, guanidinoalkyl, hydroxyguanidinoalkyl, cyano, trifluoromethoxy, perfluoroethoxy, aminocarbonylamino, mono($C_{1-4}$)alkylaminocarbonylamino, di($C_{1-4}$)alkylaminocarbonylamino, N—($C_{1-4}$)alkyl-N-aminocarbonyl-amino, N—($C_{1-4}$)alkyl-N-mono($C_{1-4}$)alkylaminocarbonyl-amino or N—($C_{1-4}$)alkyl-N-di($C_{1-4}$)alkylaminocarbonyl-amino.

"Surface layer" as used herein refers to a layer of small-molecule ligands coordinated to the nanocrystal's outer surface, which may be further cross-linked or modified as explained herein. For example, the surface layer may be modified to deprotect or unmask or react with functional groups present on the ligand, using conditions known to those of skill in the art. The surface layer may have other or additional surface coatings that modify the solubility properties of the particle, which are sometimes referred to herein as "coating layers," "capping layers," or "coatings." The surface layer may also be operably bound to a cargo molecule, such as, for example, an antibody, polynucleotide, or other biomolecule.

"Nanocrystal" as used herein can refer to a particle made out of an inorganic substance that typically has an ordered crystalline structure having at least one major dimension in the nanosize range, for example, at least one major dimension measuring from 1 to 1000 nanometers. The term "nanocrystal" can refer to a "core nanocrystal" consisting of crystalline particle, or a "core/shell nanocrystal," which describes a nanocrystal having a nanocrystal core of a first material and a shell layer of a second material surrounding the core. In general, a nanocrystal including both core and core/shell nanocrystal can have a diameter of from about 1 to about 1000 nm, about 1 nm to about 100 nm, or about 1 nm to 50 nm.

The nanocrystals, such as those used in the embodiments described herein, can be bright fluorescent nanocrystals, and nanoparticles prepared from such bright fluorescent nanocrystals can also be bright. For example, a typical quantum yield for a nanoparticle can be at least about 10%, at least 20%, at least 30%, at least 40%, and at least 50% or greater than 50%. In some embodiments, nanocrystals can have a surface layer of ligands to protect them from degradation during use or while in storage; thus isolated nanocrystals made by the methods of embodiments can have a surface layer of ligands on the outside of the shell of the nanocrystal.

"Nanoparticle" as used herein refers to any nanocrystal, such as a core nanocrystal or core/shell nanocrystal, having any associated organic coating or other material on the surface of the nanocrystal that is not removed from the surface by ordinary solvation. The organic coating or other material can further be cross-linked, can have other or additional surface coatings that can modify the properties of the particle, for example, increasing or decreasing solubility in water or other solvents. Nanocrystals having such crosslinked or modified coatings on their surfaces are encompassed by the term 'nanoparticle.'

"Quantum dot" as used herein typically refers to a nanocrystalline particle made from a material that in the bulk is a semiconductor or insulating material, which has a tunable photophysical property in the near ultraviolet (UV) to far infrared (IR) range.

The term "water-soluble" is used herein to mean the item can be soluble or suspendable in an aqueous-based solution, such as in water or water-based solutions or buffer solutions, including those used in biological or molecular detection systems as known by those skilled in the art. While water-soluble nanoparticles are not truly 'dissolved' in the sense that term is used to describe individually solvated small molecules, they are solvated and suspended in solvents that are compatible with their outer surface layer. Thus, a nanoparticle that is readily dispersed in water can be considered "water-soluble" or the term "water-dispersible" can be used to describe this property. A "water-soluble" or "water dispersible" nanoparticle can also be considered "hydrophilic" when surface is compatible with water.

The term "hydrophobic nanoparticle" as used herein can refer to a nanoparticle that can be readily dispersed in or dissolved in a water-immiscible solvent such as, for example, hexanes, toluene, and the like. Such nanoparticles are generally not readily dispersed in water.

Various embodiments are directed to methods for preparing water-soluble semiconducting, insulating, or metallic nanoparticles including the steps of admixing one or more nanocrystal precursors and one or more multi-functional surface ligands with a solvent to form a solution and heating the solution to a suitable temperature, and in certain embodiments, methods may include the steps of admixing nanocrystal cores, one or more nanocrystal precursors, and one or more multi-functional surface ligands with a solvent to form a solution and heating the solution to a suitable temperature. In such embodiments, the one or more multi-functional surface ligands may at least include a nanocrystal binding center, a linker, and a functional group, which imparts functionality on the nanocrystal. As used herein the term "functional group" may refer to a group that affects reactivity, solubility, or both reactivity and solubility when present on a multi-functional surface ligand. Embodiments can include a wide variety of functional groups that can impart various types of functionality on the nanocrystal including hydrophilicity, water-solubility, or dispersability and/or reactivity, and the functionality may generally not include only hydrophobicity or only solubility in organic solvents without increasing reactivity. For example, a functional group that is generally hydrophobic but that increases reactivity such as an alkene or alkyne and certain esters and ethers can be encompassed by embodiments, whereas alkyl groups, which do not generally impart reactivity but increase hydrophobicity may be excluded.

In certain embodiments, the nanoparticles produced by the methods of such embodiments may be coated with ligands that impart water solubility and/or reactivity on the nanoparticle obviating the need for ligand replacement. Without wishing to be bound by theory, eliminating ligand replacement may provide more consistent thermodynamic properties, which may lead to reduction in variability of coating and less loss of quantum yield, among other improvements in the properties of nanoparticles produced by the methods embodied herein. Eliminating ligand replacement may also allow for the production of nanoparticles having a wide variety of functional groups associated with the coating. In particular, while ligand replacement is generally limited to production of nanoparticles having amine and/or carboxylic acid functional groups, in various embodiments, the skilled artisan may choose among numerous functional groups when preparing the multi-functional ligands and may, therefore, generate nanoparticles that provide improved water-solubility or water-dispersity and/or support improved crosslinking and/or improved reactivity with cargo molecules.

The methods of embodiments are not limited by the type of multi-functional ligands used, or the type or number of functional groups associated with the multi-functional ligands. For example, in particular embodiments, the multi-functional ligands used in embodiments of the method, and embodied as composition may be of general Formula I:

$$X_n\text{-}(L\text{-}R)_y \qquad \text{I}$$

where X is a nanocrystal binding center, L is a linker, R can be hydrogen or a functional group and n and y are each independently 1 to 3. In such embodiments, when n and/or y are more than 1, each X, each L, and each R can be the same or different. Thus, for example, a multi-functional ligand of Formula I where y is 2 may have two different L's and two different R's on the same molecule.

The nanocrystal binding center (X) may be any moiety capable of forming a coordination complex with one or more metal atom of the nanocrystal, and in certain embodiments, the nanocrystal binding center may be capable of forming a passivation layer on the surface of the nanocrystal. For example, in some embodiments, the nanocrystal binding center (X) may be a phosphonic acid, phosphinic acid, phosphine, phosphine oxide, carboxylic acid, amine, imidazole, thiol, sulfonate, or selenate, and the like, and in other embodiments, the nanocrystal binding center (X) may be phosphonic acid, phosphinic acid, or carboxylic acid. In particular embodiments, when y is 1, (X) may be phosphonic acid, carboxylic acid, or the like, and in certain embodiments, the choice of nanocrystal binding center may allow for two or more -L-R groups associated with the same nanocrystal binding center. Thus, in some embodiments, when y is 2, (X) may be phosphinic acid or the like, and in other embodiments, when y is 3, (X) may be, for example, phosphine or phosphine oxide.

The linker (L) of various embodiments may be a covalent bond or saturated or unsaturated aliphatic chain of from 2 to about 500 carbon atoms, polyethylene glycol (PEG) having from 2 to about 500 carbon atoms, a polyester having from 2 to about 500 carbon atoms, or any combination thereof. In some embodiments, the linker (L) may be a saturated or unsaturated aliphatic chain of from 2 to about 250 carbon atoms, from 2 to about 100 carbon atoms, from 2 to about 50 carbon atoms, or from 2 to about 20 or 25 carbon atoms. For example, in some embodiments, L may be a $C_4$-$C_{18}$ alkyl, $C_4$-$C_{18}$ alkenyl, $C_4$-$C_{18}$ alkynyl, $C_6$-$C_{16}$ alkyl, $C_6$-$C_{16}$ alkenyl, $C_6$-$C_{16}$ alkynyl, $C_8$-$C_{12}$ alkyl, $C_8$-$C_{12}$ alkenyl, or $C_8$-$C_{12}$ alkynyl, and in particular embodiments, the linker (L) may be a $C_{11}$-$C_{16}$ alkyl. As will be recognized by the skilled artisan, the alkyl chains may be of any length and are not limited by the exemplary number of carbons above. In other embodiments, the linker (L) may be PEG having from 2 to about 250 carbon atoms, from 2 to about 100 carbon atoms, from 2 to about 50 carbon atoms, or from 2 to about 20 or 25 carbon atoms, and in certain embodiments, the linker (L) may be PEG-2, PEG-4, PEG-6, PEG-8, PEG-12, PEG-20, or PEG-24. In still other embodiments, the linker (L) may be a polyester having from 2 to 100 covalently linked esters. In yet other embodiments, a $C_2$-$C_{10}$ alkyl, $C_2$-$C_{10}$ alkenyl, or $C_2$-$C_{10}$ alkynyl may be covalently attached to a PEG or polyester that connects the PEG or polyester to either the nanocrystal binding center or the functional group, and in further embodiments, a $C_2$-$C_{10}$ alkyl, $C_2$-$C_{10}$ alkenyl, or $C_2$-$C_{10}$ alkynyl may be covalently attached to both ends of a PEG or polyester and connect the PEG or polyester to both the binding center and the functional group. In still further embodiments, PEG and/or esters and/or polyesters may be dispersed between alkyls, alkenyls, or alkynyls to produce linkers (L) having segments of different linker groups.

Embodiments are not limited by the type of functional groups (R). For example, in various embodiments, (R) may be a functional group such as halide, hydroxyl, carboxylic acid, carboxylic acid ester, ester, succinimidyl ester, alkyl ester, benzyl ester, aldehyde, amine including primary, secondary, or tertiary amine, polyamine, thiol, isocyanate, substituted or unsubstituted cycloalkyl, substituted or unsubstituted heterocycloalkyl, benzyl, aryl, heteroaryl, alkaryl, heterocycle such as imidazole, pyridone, or tetrazole, cyano, cyanoalkyl, thiol, thioalkyl, alkoxy, thioalkoxy, ether, alkyl ether, thioether, polyether, PEG, carbamates, various silyl and silyl esters, and the like, and combinations thereof. In some embodiments, R may be a cycloalkyl that is substituted with one or more alkenyl or alkynyl. In other embodiments, R may be hydrogen; however, in such embodiments, hydrogen may generally not be the only group. For example, in embodiments where R is hydrogen, y may generally be more than 1 and a second R can be a functional group such as those described above. In particular embodiments, (R) can be a functional group such as any of:

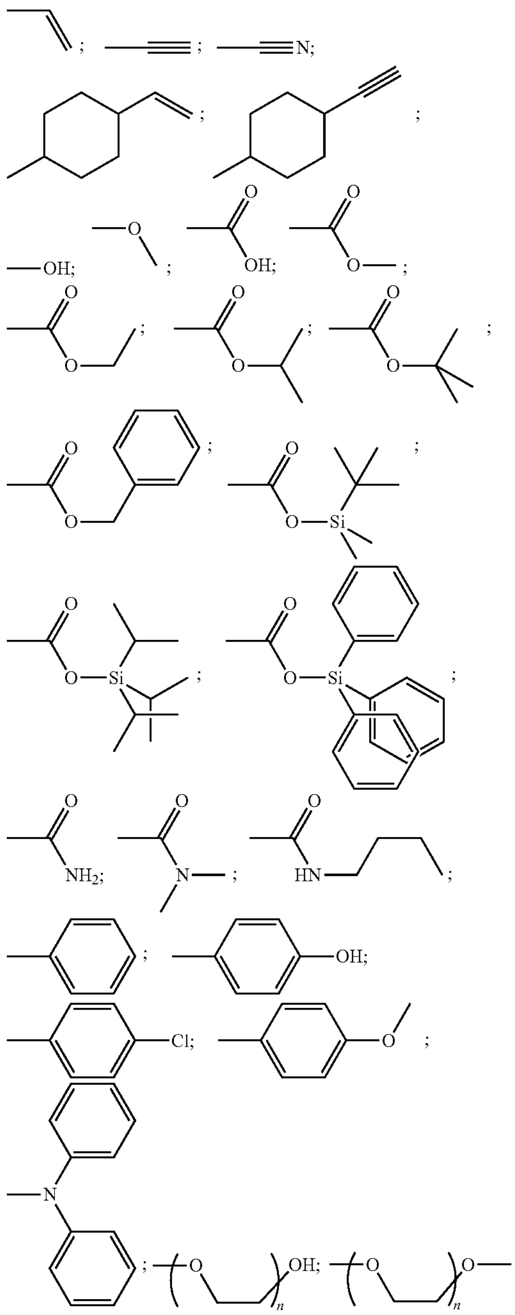

and the like. In other embodiments, any of these functional groups may be combined by either linking them together or by linking them via alkyl or alkenyl groups of for example, 1 to 6 carbons. In certain embodiments, the functional group (R) may not be a single carboxylic acid, amine, or hydroxyl; however, these moieties may be combined with other functional groups on a multi-functional ligand.

In some exemplary embodiments, the multi-functional ligand may be bi-functional phosphonate of general Formula II:

II

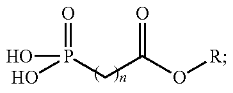

or the multi-functional ligand may be a bi-functional carboxylate of general Formula IIa:

IIa

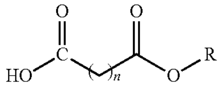

where n can be 1 to 100 and R may be hydrogen, hydroxyl, $C_1$-$C_8$ alkyl, $C_2$-$C_8$ alkenyl, $C_2$-$C_8$ alkynyl each of which may be substituted with one or more carboxylic acid, carboxylic acid ester, cyano, carboxamide, hydroxy, alkoxy, thio, thioalkoxy, amine, or polar heterocycle, or R may be a PEG of any length provided above. In particular embodiments, R may be $C_1$-$C_8$ alkyl, benzyl, substituted or unsubstituted aryl, or a silyl group of formula, $SiR'_3$, where each R' can independently be $C_1$-$C_4$ alkyl or substituted or unsubstituted aryl.

In other exemplary embodiments, the multi-functional ligand may be a bi-functional phosphonate ligand, phosphonoalkanoic acid amide, of Formula III:

III

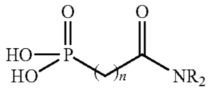

the multi-functional ligand may be a bi-functional carboxylate of general Formula Ma:

IIIa

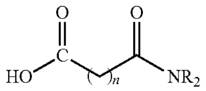

where n can be 1 to 100, and each R can independently be hydrogen, or $C_1$-$C_8$ alkyl, $C_2$-$C_8$ alkenyl, $C_2$-$C_8$ alkynyl group each of which may be substituted with one or more carboxylic acid, carboxylic acid ester, cyano, carboxamide, hydroxy, alkoxy, thio, thioalkoxy, amine, or polar heterocycle, or R may be a PEG of any length provided above.

In still other embodiments, the multi-functional ligand may be a bi-functional phosphonate ligand including a phosphonic acid and a PEG chain as illustrated in Formula IV:

IV

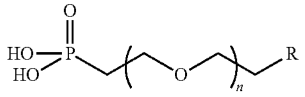

the multi-functional ligand may be a bi-functional carboxylate of general Formula IVa:

IVa

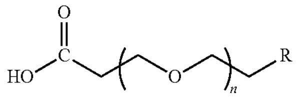

where n can be 1 to 100 and R may be ester, succinimidyl, succinimidyl ester, alkyl, benzyl, amine, polyamine, thiol, isocyanate, substituted or unsubstituted aryl, alkaryl, cyano, cyanoalkyl, thiol, thioalkyl, alkoxy, thioalkoxy, ether, alkyl ether, thioether, various silyl and silyl esters. In certain embodiments, R can be H, hydroxyl, carboxylic acid, $C_1$-$C_4$ alkoxy, benzyl, substituted or unsubstituted aryl, or a silyl group of formula, $SiR'_3$, where each R' can independently be $C_1$-$C_4$ alkyl or substituted or unsubstituted aryl.

In yet other exemplary embodiments, the multi-functional ligand may be a bi-functional phosphonate, cyanoalkylphosphonic acid, of Formula V:

V

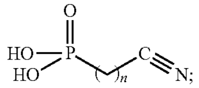

or the multi-functional ligand may be a bi-functional carboxylate of general Formula Va:

Va

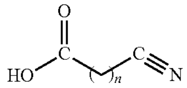

where n can be 1 to 100.

In further exemplary embodiments, the multi-functional ligand may be a bi-functional phosphonate of Formula VI:

VI

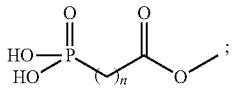

or the multi-functional ligand may be a bi-functional carboxylate of general Formula VIa:

VIa

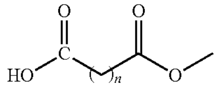

where n can be 1 to 100.

In further exemplary embodiments, the multi-functional ligand may be a bi-functional phosphonate of Formula VII:

VII

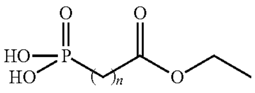
;

or the multi-functional ligand may be a bi-functional carboxylate of general Formula VIIa:

VIIa

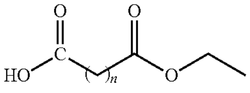

where n can be 1 to 100.

In further exemplary embodiments, the multi-functional ligand may be a bi-functional phosphonate of Formula VIII:

VIII

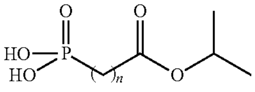
;

or the multi-functional ligand may be a bi-functional carboxylate of general Formula VIIIa:

VIIIa

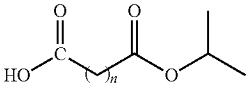

where n can be 1 to 100.

In further exemplary embodiments, the multi-functional ligand may be a bi-functional phosphonate of Formula IX:

IX

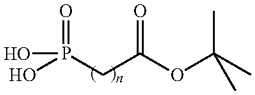
;

or the multi-functional ligand may be a bi-functional carboxylate of general Formula IXa:

IXa

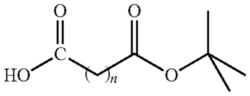

where n can be 1 to 100.

In further exemplary embodiments, the multi-functional ligand may be a bi-functional phosphonate of Formula X:

X

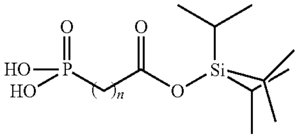
;

or the multi-functional ligand may be a bi-functional carboxylate of general Formula Xa:

Xa

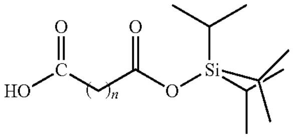

where n can be 1 to 100.

In further exemplary embodiments, the multi-functional ligand may be a bi-functional phosphonate of Formula XI:

XI

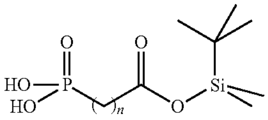
;

or the multi-functional ligand may be a bi-functional carboxylate of general Formula XIa:

XIa

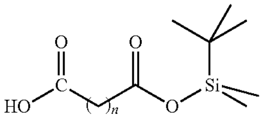

where n can be 1 to 100.

In further exemplary embodiments, the multi-functional ligand may be a bi-functional phosphonate of Formula XII:

XII

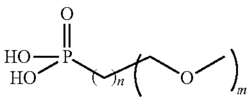
;

or the multi-functional ligand may be a bi-functional carboxylate of general Formula XIIa:

XIIa

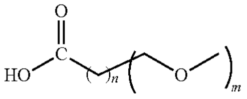

where m and n can independently be 1 to 100.

In further exemplary embodiments, the multi-functional ligand may be a bi-functional phosphonate of Formula XIII:

XIII

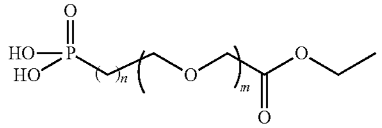

;

or the multi-functional ligand may be a bi-functional carboxylate of general Formula XIIIa:

XIIIa

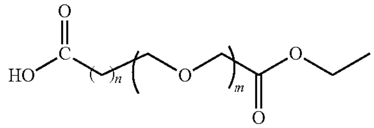

where m and n can independently be 1 to 100.

In further exemplary embodiments, the multi-functional ligand may be a bi-functional phosphonate of Formula XIV:

XIV

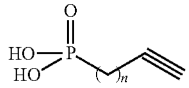

;

or the multi-functional ligand may be a bi-functional carboxylate of general Formula XIVa:

XIVa

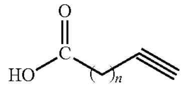

where n can be 1 to 100.

In further exemplary embodiments, the multi-functional ligand may be a bi-functional phosphonate of Formula XV:

XV

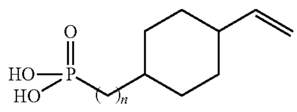

;

or the multi-functional ligand may be a bi-functional carboxylate of general Formula XVa:

XVa

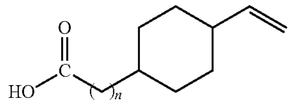

where n can be 1 to 100.

In further exemplary embodiments, the multi-functional ligand may be a bi-functional phosphonate of Formula XVI:

XVI

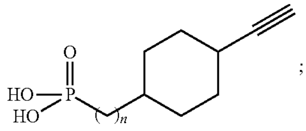

;

or the multi-functional ligand may be a bi-functional carboxylate of general Formula XVIa:

XVIa

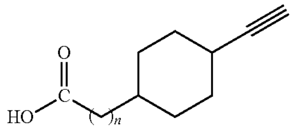

where n can be 1 to 100.

In further exemplary embodiments, the multi-functional ligand may be a bi-functional phosphonate of Formula XVII:

XVII

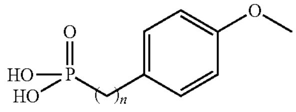

;

or the multi-functional ligand may be a bi-functional carboxylate of general Formula XVIIa:

XVIIa

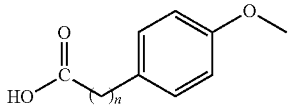

where n can be 1 to 100.

In further exemplary embodiments, the multi-functional ligand may be a bi-functional phosphonate of Formula XVIII:

XVIII

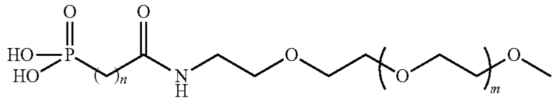

;

or the multi-functional ligand may be a bi-functional carboxylate of general Formula XVIIIa:

XVIIIa

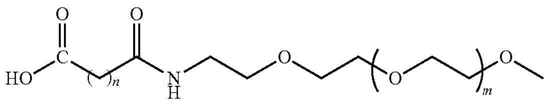

where m and n can independently be 1 to 100.

In still further embodiments, the phosphonate and carbonate nanoparticle binding centers shown in Formulae II through XVIIIa may be substituted with another nanoparticle binding center capable of forming a covalent bond to a linker such as any of the (X) moieties described above.

In certain exemplary embodiments, the multi-functional ligands may be any of bi-functional phosphonates provided in Table 1.

TABLE 1

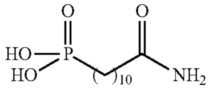
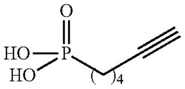
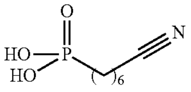
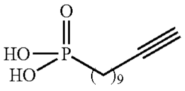
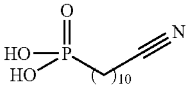
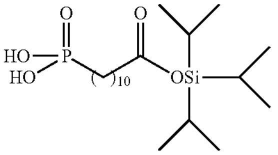
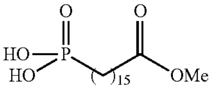
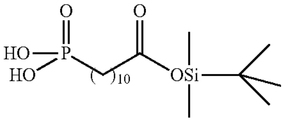
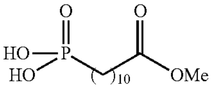
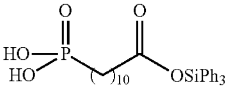
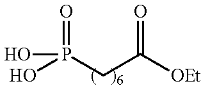
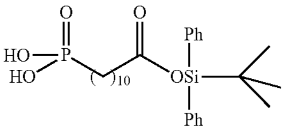
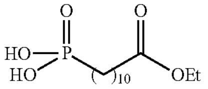
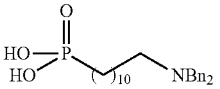
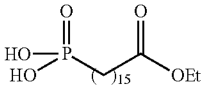
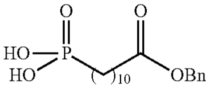
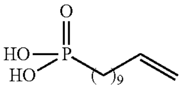
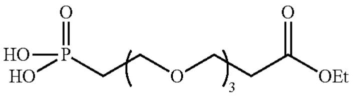
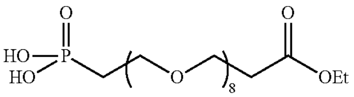
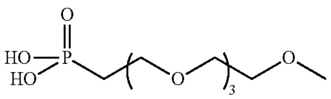

TABLE 1-continued

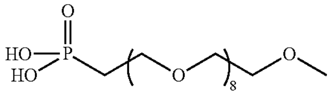
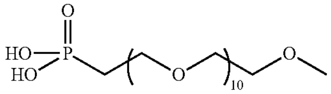

In other exemplary embodiments, the multi-functional ligands may be any of bi-functional carboxylates provided in Table 2.

TABLE 2

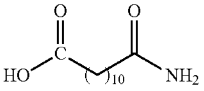
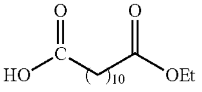
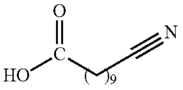
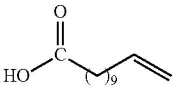
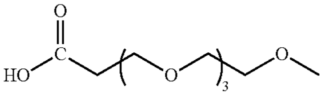
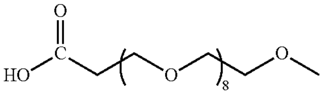
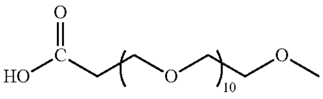
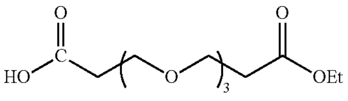
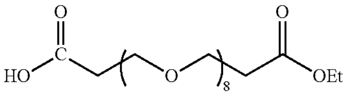

In some exemplary embodiments, the multi-functional ligands may be a tri-functional phosphinate of Formula XIX:

XIX

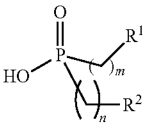

where m and n can independently be 1 to 100, and $R^1$ and $R^2$ can each independently be hydrogen, hydroxyl, carboxylic acid, carboxylic acid ester, ester, succinimidyl ester, alkyl ester, benzyl ester, aldehyde, amine, polyamine, isocyanate, benzyl, substituted or unsubstituted aryl, alkaryl, cyano, cyanoalkyl, thiol, thioalkyl, alkoxy, thioalkoxy, ether, alkyl ether, thioether, polyether, various silyl and silyl esters, heteroaryl, heterocycle cycloalkyl, and the like, and combinations thereof, and at least one of $R^1$ or $R^2$ is not hydrogen. In particular embodiments, each $R^1$ and $R^2$ may independently be $C_1$-$C_8$ alkyl, benzyl, substituted or unsubstituted aryl, or a silyl group of formula, $SiR'_3$, where each R' can independently be $C_1$-$C_4$ alkyl or substituted or unsubstituted aryl.

In other exemplary embodiments, the multi-functional ligands may be a tri-functional phosphinate of Formula XX:

XX

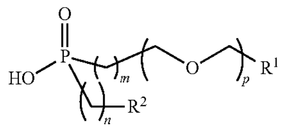

where m, n, and p can each independently be 1 to 100, and $R^1$ and $R^2$ can each independently be hydrogen, hydroxyl, carboxylic acid, carboxylic acid ester, ester, succinimidyl ester, alkyl ester, benzyl ester, aldehyde, amine, polyamine, thiol, isocyanate, benzyl, substituted or unsubstituted aryl, alkaryl, cyano, cyanoalkyl, thiol, thioalkyl, alkoxy, thioalkoxy, ether, alkyl ether, thioether, polyether, various silyl and silyl esters, heteroaryl, heterocycle, cycloalkyl, and the like, and combinations thereof. In particular embodiments, each $R^1$ and $R^2$ may independently be $C_1$-$C_8$ alkyl, benzyl, substituted or unsubstituted aryl, or a silyl group of formula, $SiR'_3$, where each R' can independently be $C_1$-$C_4$ alkyl or substituted or unsubstituted aryl.

In still other exemplary embodiments, the multi-functional ligands may be a tri-functional phosphinate of Formula XXI:

XXI

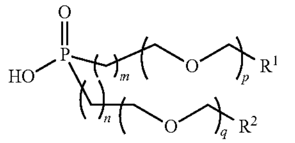

where m, n, p, and q can each independently be 1 to 100, and $R^1$ and $R^2$ can each independently be hydrogen, hydroxyl, carboxylic acid, carboxylic acid ester, ester, succinimidyl ester, alkyl ester, benzyl ester, aldehyde, amine, polyamine, isocyanate, benzyl, substituted or unsubstituted aryl, alkaryl, cyano, cyanoalkyl, thiol, thioalkyl, alkoxy, thioalkoxy, ether, alkyl ether, thioether, polyether, various silyl and silyl estersheteroaryl, heterocycle, cycloalkyl, and the like, and combinations thereof. In particular embodiments, each $R^1$ and $R^2$ may independently be $C_1$-$C_8$ alkyl, benzyl, substituted or unsubstituted aryl, or a silyl group of formula, $SiR'_3$, where each R' can independently be $C_1$-$C_4$ alkyl or substituted or unsubstituted aryl.

In further exemplary embodiments, the multi-functional ligand may be a tri-functional phosphinate of Formula XXII:

XXII

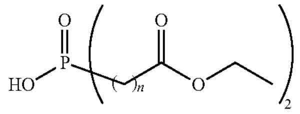

where each n can independently be 1 to 100.

In further exemplary embodiments, the multi-functional ligand may be a tri-functional phosphinate of Formula XXIII:

XXIII

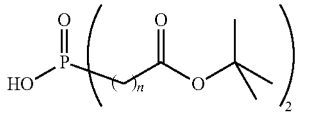

where each n can independently be 1 to 100.

In further exemplary embodiments, the multi-functional ligand may be a tri-functional phosphinate of Formula XXIV:

XXIV

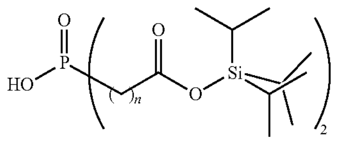

where each n can independently be 1 to 100.

In further exemplary embodiments, the multi-functional ligand may be a tri-functional phosphinate of Formula XV:

XXV

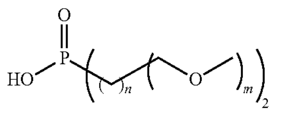

where each m and n can independently be 1 to 100.

In further exemplary embodiments, the multi-functional ligand may be a tri-functional phosphinate of Formula XXVI:

XXVI

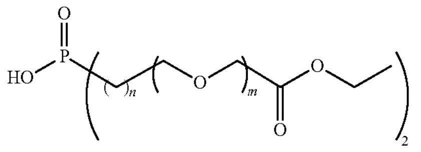

where each m and n can independently be 1 to 100.

In further exemplary embodiments, the multi-functional ligand may be a tri-functional phosphinate of Formula XXVII:

XXVII

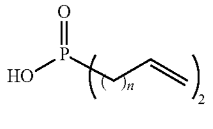

where each n can independently be 1 to 100.

In further exemplary embodiments, the multi-functional ligand may be a tri-functional phosphinate of Formula XXVIII:

XXVIII

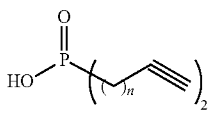

where each n can independently be 1 to 100.

In further exemplary embodiments, the multi-functional ligand may be a tri-functional phosphinate of Formula XXIX:

XXIX

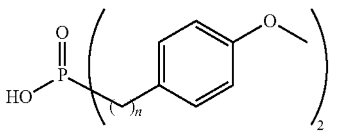

where each n can independendtly be 1 to 100.

In further exemplary embodiments, the multi-functional ligand may be a tri-functional phosphinate of Formula XXX:

XXX

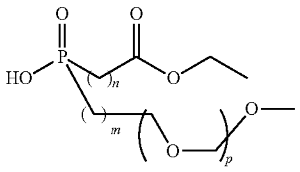

where each m, n, and p can each independently be 1 to 100.

In further exemplary embodiments, the multi-functional ligand may be a tri-functional phosphinate of Formula XXXI:

XXXI

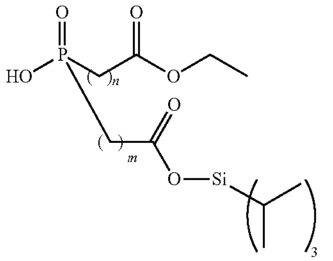

where m and n can independently be 1 to 100.

In each of the embodiments described above including Formulae I-XXXI and various substituents that include n, m, p, and/or q variables, the value of n, m, p, and q can independently be an integer from 1 to 100, 1 to 150, 1 to 200, 1 to 250, 1 to 300, 1 to 400, or 1 to 500 or any value between these. In other embodiments, n, m, p, and q can independently, be from 1 to 75, 1 to 50, 1 to 40, 1 to 30, 1 to 25, 1 to 20, 1 to 15, or 1 to 10, or any value between these.

In certain exemplary embodiments, the multi-functional ligands may be any of tri-functional phosphinates provided in Table 3.

TABLE 3

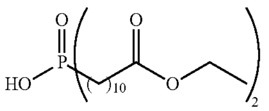

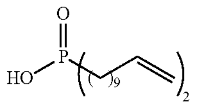

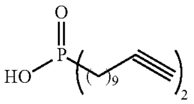

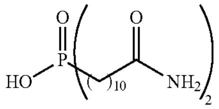

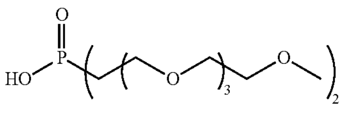

TABLE 3-continued

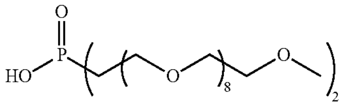

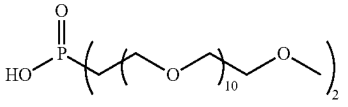

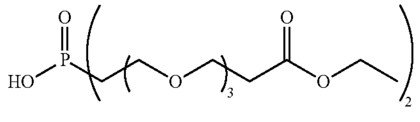

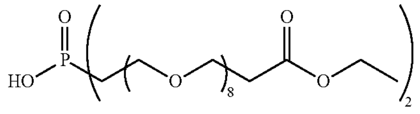

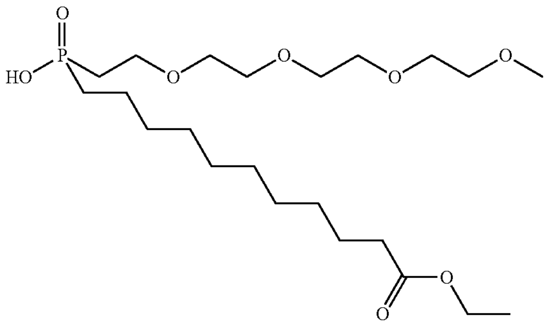 [SMILES: CCOC(=O)CCCCCCCCCCP(=O)(O)CCOCCOCCOCCOC]

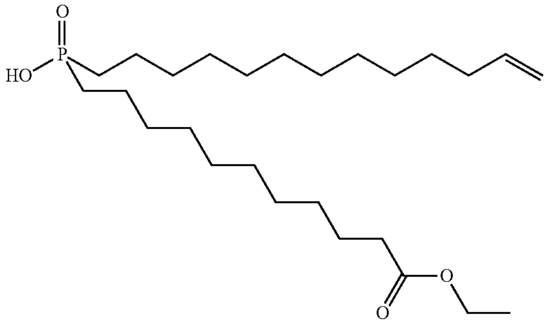 [SMILES: C=CCCCCCCCCCCCP(=O)(O)CCCCCCCCCCC(=O)OCC]

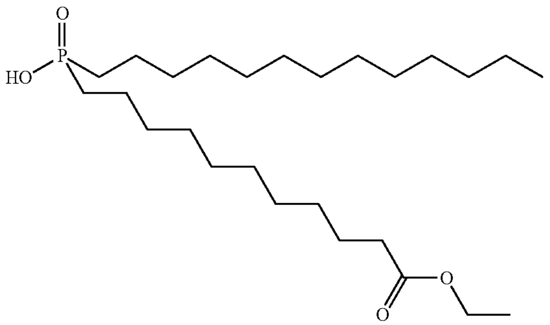 [SMILES: CCCCCCCCCCCCCP(=O)(O)CCCCCCCCCCC(=O)OCC]

In still further embodiments, the phosphinate binding centers shown in Formulae XIX through XXXI may be substituted with another nanoparticle binding center capable of forming two covalent bonds to separate linkers.

In some embodiments, the linker (L) of Formula I may be branched providing for multi-functional ligands having more than one functional group (R) and/or one or more nanoparticle binding center (X) connected by a single linker. For example, embodiments of the invention include multi-functional ligands of Formulae XXXII and XXXIII:

$X\text{-}L\text{-}(L^1)_zR_z$ XXXII; and $X_z\text{-}(L^1)_z\text{-}L\text{-}R$ XXXIII;

where X may be a nanoparticle binding center, L may be a linker, $L^1$ may be a branch of the linker L, R may be a functional group, and z can be from 2 to 5 and indicates the number of branches ($L^1$) and corresponding number of functional groups (R) or nanoparticle binding centers (X). In such embodiments, each R of the multi-functional ligands of Formula XXXII may be independently selected. Therefore, a each branch ($L^1$) of a branched linker (L) of Formula XXXII may have the same functional group or a different functional group. For example, a multi-functional ligand of Formula XXXII with a linker having three branches ($(L^1)_3$) may include up to 3 functional groups (R). Similarly, each branch ($L^1$) of a branched linker (L) of Formula XXXIII may have the same or a different nanoparticle binding center (X). Thus, a multi-functional ligand of Formula XXXIII having three branches ($(L^1)_3$) may include up to 3 different functional groups (R).

As above, in various embodiments, the nanocrystal binding center (X) may be a phosphonic acid, phosphinic acid, phosphine, phosphine oxide, carboxylic acid, amine, imidazole, thiol, sulfonate, or selenate, and the like, and in some embodiments, the nanocrystal binding center (X) may be phosphonic acid, phosphinic acid, or carboxylic acid. In such embodiments, the functional group (R) may be hydrogen, halide, hydroxyl, carboxylic acid, carboxylic acid ester, ester, succinimidyl ester, alkyl ester, benzyl ester, aldehyde, amine including primary, secondary, or tertiary amine, polyamine, thiol, isocyanate, cycloalkyl, heterocycloalkyl, benzyl, aryl, heteroaryl, alkaryl, heterocyclic group, such as imidazole, pyridone, or tetrazole, cyano, cyanoalkyl, thiol, thioalkyl, alkoxy, thioalkoxy, ether, alkyl ether, thioether, polyether, carbamates, various silyl and silyl esters, and the like, and combinations thereof. In particular embodiments, the functional group (R) may be any of:

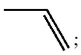; ; ; ;

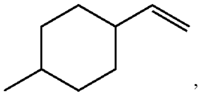, 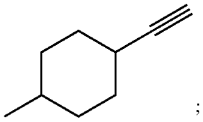;

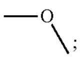; ; 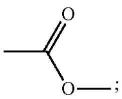; 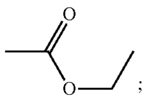;

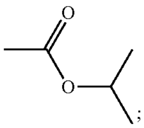; 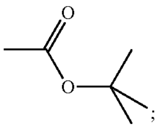;

-continued

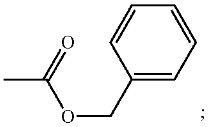; 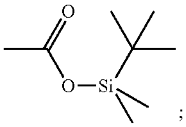;

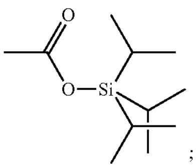; 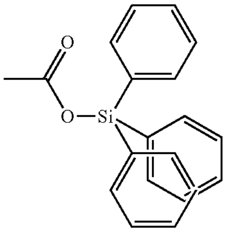;

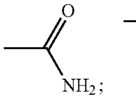; 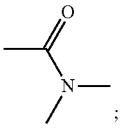; 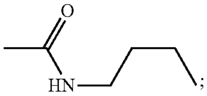;

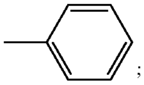; 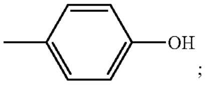;

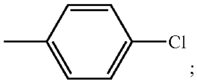; 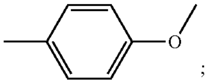;

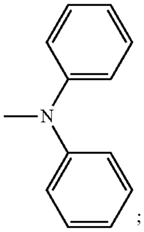; 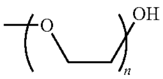;

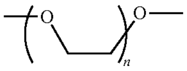, and the like. In other embodiments, any of these functional groups may be combined by either linking them together or by linking them via alkyl or alkenyl groups of for example, 1 to 6 carbons. In certain embodiments, the functional group (R) may not be a single carboxylic acid, amine, or hydroxyl; however, these moieties may be combined with other functional groups on a multi-functional ligand.

The linker (L) of various embodiments may be a covalent bond or saturated or unsaturated aliphatic chain of from 2 to about 500 carbon atoms, polyethylene glycol (PEG) having from 2 to about 500 carbon atoms, a polyester having from 2 to about 500 carbon atoms, or any combination thereof. In some embodiments, the linker (L) may be a saturated or unsaturated aliphatic chain of from 2 to about 250 carbon atoms, from 2 to about 100 carbon atoms, from 2 to about 50 carbon atoms, or from 2 to about 20 or 25 carbon atoms. For example, in some embodiments, L may be a $C_4$-$C_{18}$ alkyl, $C_4$-$C_{18}$ alkenyl, $C_4$-$C_{18}$ alkynyl, $C_6$-$C_{16}$ alkyl, $C_6$-$C_{16}$ alkenyl, $C_6$-$C_{16}$ alkynyl, $C_8$-$C_{12}$ alkyl, $C_8$-$C_{12}$ alkenyl, or $C_8$-$C_{12}$ alkynyl, and in particular embodiments, the linker (L) may be a $C_{11}$-$C_{16}$ alkyl. As will be recognized by the skilled artisan, the alkyl chains may be of any length and are not limited by the exemplary number of carbons above. In other embodiments, the linker (L) may be PEG having from 2 to about 250 carbon atoms, from 2 to about 100 carbon atoms, from 2 to about 50 carbon atoms, or from 2 to about 20 or 25 carbon atoms, and in certain embodiments, the linker (L) may be PEG-2, PEG-4, PEG-6, PEG-8, PEG-12, PEG-20, or PEG-24. In still other embodiments, the linker (L) may be a polyester having from 2 to 100 covalently linked esters. In yet other embodiments, a $C_2$-$C_{10}$ alkyl, $C_2$-$C_{10}$ alkenyl, or $C_2$-$C_{10}$ alkynyl may be covalently attached to a PEG or polyester that connects the PEG or polyester to either the nanocrystal binding center or the functional group, and in further embodiments, a $C_2$-$C_{10}$ alkyl, $C_2$-$C_{10}$ alkenyl, or $C_2$-$C_{10}$ alkynyl may be covalently attached to both ends of a PEG or polyester and connect the PEG or polyester to both the binding center and the functional group. In still further embodiments, PEG and/or esters and/or polyesters may be dispersed between alkyls, alkenyls, or alkynyls to produce linkers (L) having segments of different linker groups.

Each branch ($L^1$) may be a covalent bond or saturated or unsaturated aliphatic chain of from 2 to about 20 carbon atoms, polyethylene glycol (PEG) having from 2 to about 20 carbon atoms, a polyester having from 2 to about 20 carbon atoms, or any combination thereof, and the composition of each branch ($L^1$) may be the same or different from the composition of the linker. For example, in some embodiments, the linker (L) may be a $C_2$-$C_{20}$ alkyl, and each branch of the linker ($L^1$) may be a PEG or polyester. In other embodiments, each branch of the linker ($L^1$) may independently have the same composition as the linker (L) or a different composition. For example, a multi-functional ligand with a linker (L) three branches ($(L^1)_3$) may have two PEG or polyester branches and one alkyl branch or one PEG or polyester branch and two alkyl branches. In addition, each branch may be of a different length or each branch may be of the same length. Therefore, for example, a multi-functional ligand with a linker (L) three branches ($(L^1)_3$) may have a one $C_2$ alkyl, one $C_4$ branch, and one $C_6$ branch, or three $C_4$ branches.

In some embodiments, multi-functional ligands having two or more branches may further include multi-functional ligands of Formula XXXIV or XXXV:

XXXIV

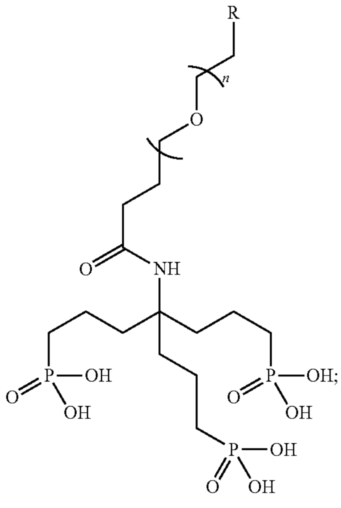

or

-continued

XXXV

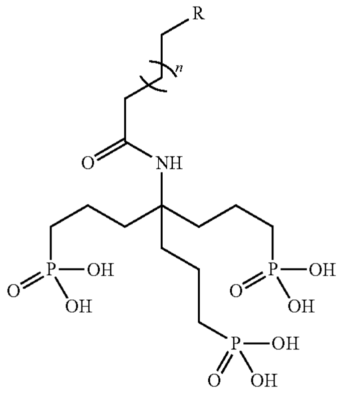

were n is 1 to 20 and R is a functional group as described above. In some embodiments, the phosphonate nanoparticle binding center may be any nanoparticle binding center described above. In other exemplary embodiments, multi-functional ligands having two or more branches may further include multi-functional ligands of Formula XXXVI or XXXVII:

XXXVI

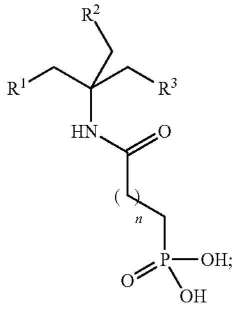

or

XXXVII

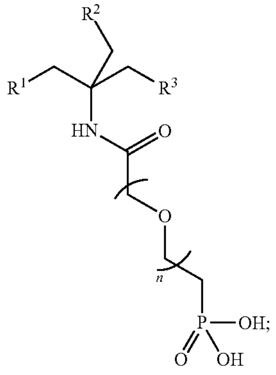

where were n is 1 to 20 and $R^1$, $R^2$, and $R^3$ are each independently functional groups as described above.

In other embodiments, one or more functional groups (R) present on a multi-functional ligands of Formulae I through XXXVII may be protected or masked. For example, in some embodiments, a masked carboxylic acid such as, for example, a carboxylic acid ester, or a masked amino such as, for example, a cyano, may be provided as a functional group on a multi-functional ligand during preparation of the nanoparticle, and the functional group may be deprotected or unmasked in a subsequent step of the method. Protecting groups and methods for deprotecting or unmasking protected functional groups are well known in the art. For example, methods for attaching and removing various protecting groups are described in T. H. Greene, Protective Groups in Organic Synthesis ($2^{nd}$ ed. 1991), which is hereby incorporated by reference in its entirety.

While the multi-functional ligands presented above are defined in the context of their use in methods for preparing nanoparticles, embodiments also include each of the multi-functional ligands embodied above, including those of Formulae I through XXXVII, those multi-functional ligands identified in Tables 1-3, and such multi-functional ligands having one or more protected or masked functional groups. Embodiments further include nanoparticles having one or more of such multi-functional ligands associated with an outer surface of the nanoparticle either through a direct interaction such as formation of a coordination complex, or by crosslinking with any coating associated with the nanoparticle, such as a surfactant layer which coats most commercially available nanoparticles. Still other embodiments include salts of the various multi-functional ligands such as, for example, a sodium, potassium, alkylammonium, zinc or cadmium salt of a phosphonic acid, phosphinic acid, or carboxylic acid.

In some embodiments, methods for preparing water-soluble semiconductor or metallic nanoparticles can include the steps of admixing a first core precursor and a second core precursor and one or more multi-functional ligand with a solvent to form a solution. As will be recognized by the skilled artisan, nanocrystals can be made of any suitable metal and non-metal atoms that are known to form semiconductor nanocrystals, and the skilled artisan may choose precursors necessary to produce suitable nanoparticles. For example, semiconductor nanoparticles of certain embodiments can be prepared from materials including, but are not limited to, Group 2-16, 12-16, 13-15 and 14 elements, and combining appropriate precursors and methods embodied herein can result semiconductor nanocrystals such as, but not limited to, ZnS, ZnSe, ZnTe, CdS, CdSe, CdTe, HgS, HgSe, HgTe, MgS, MgSe, MgTe, CaS, CaSe, CaTe, SrS, SrSe, SrTe, BaS, BaSe, BaTe, GaN, GaP, GaAs, GaSb, InP, InAs, InSb, AlAs, AlP, AlSb, PbS, PbSe, Ge and Si and binary, ternary and quaternary mixtures thereof, and the like.

In some embodiments, a core nanocrystal can be modified to enhance the efficiency and stability of its fluorescence emissions by coating nanocrystal core with an inorganic material to create a shell around the nanocrystal core thereby creating a core/shell nanocrystal. In other embodiments, a previously prepared core nanocrystal may be coated with an inorganic material to create a core/shell nanocrystal. The core/shell nanoparticles of such embodiments, can have two distinct layers, a semiconductor or metallic core and a shell surrounding the core of an insulating or semiconductor material. Formation of the shell may be carried out by any method. For example, in some embodiments, a core/shell nanoparticle may be prepared by providing one or more additional nanocrystal precursors such as the first core precursor or second core precursors described above, which can be different than the precursors used to form the core, following core preparation, and in certain embodiments, additional solvents, multi-functional ligands, and/or reaction promoters may be provided. In some embodiments, the method may include the step of heating the mixture, and as a result of heating, the additional precursors may precipitate on the surface of the core and provide a shell layer, i.e., a semiconductor or insulator layer over the core. In other embodiments, the additional nanocrystal precursors, solvents, multi-functional ligands, and/or reaction promoters may be added to a heated mixture that contains preformed cores to initiate formation of the shell.

The shells of such embodiments may be composed of any inorganic material or combination of inorganic materials known to provide a semiconductor or insulating layer over a core nanocrystal. The shells of such embodiments may be of the same material as the core or a different material, and in some embodiments, at least one inorganic material in the shell may be different than the inorganic materials making up the core. Such inorganic materials may be provided in precursors that include, for example, Cd, Zn, Ga, Be, Mg, S, Se, Te, P, As, N, O, Sb, and the like. In some embodiments, the shell may include a combination of inorganic materials where a first element may be any of Cd, Zn, Ga, Pb, Mg or a combination thereof and a second element, such as, for example, S, Se, Te, P, As, N, O, Sb, or combinations thereof and two or more appropriate precursors may be provided to the reaction mixture to produce such combinations. For example, in various embodiments, the shell material may be CdS, CdSe, CdTe, InP, InAs, GaP, AlP, MgS, MgSe, ZnS, ZnSe, ZnTe, and mixtures thereof and in particular exemplary embodiments, the shell materials may be ZnS, ZnSe, CdS, CdSe, GaP and mixtures thereof.

The thickness of the shell may vary among embodiments and can affect fluorescence wavelength, quantum yield, fluorescence stability, and other photostability characteristics of the nanocrystal. The skilled artisan can select the appropriate thickness to achieve desired properties and may modify the methods of embodiments appropriately to achieve the appropriate thickness. For example, in some embodiments, the step of heating may be relatively short such that a thin shell is produced over the core, and in other embodiments, the step of heating may be extended to produce a thicker shell.

In certain embodiments, the shell material can be a semiconductor materials having a higher bandgap energy than the semiconductor nanocrystal core. In other embodiments, suitable shell materials can have good conduction and valence band offset with respect to the semiconductor nanocrystal core, and in some embodiments, the conduction band can be higher and the valence band can be lower than those of the core. For example, in certain embodiments, semiconductor nanocrystal cores that emit energy in the visible region such as, for example, CdS, CdSe, CdTe, ZnSe, ZnTe, GaP, InP, or GaAs, or near IR region such as, for example, InP, InAs, InSb, PbS, or PbSe may be coated with a shell material having a bandgap energy in the ultraviolet regions such, for example, ZnS, GaN, and magnesium chalcogenides such as MgS, MgSe, and MgTe. In other embodiments, semiconductor nanocrystal cores that emit in the near IR region can be coated with a material having a bandgap energy in the visible region such as CdS or ZnSe. The preparation of a coated semiconductor nanocrystal core and core/shell nanocrystals can be found in, for example, Dabbousi et al. (1997) *J. Phys. Chem. B* 101:9463, Hines et al. (1996) *J. Phys. Chem.* 100: 468-471, Peng et al. (1997) *J. Am. Chem. Soc.* 119:7019-7029, and Kuno et al. (1997) *J. Phys. Chem.* 106:9869 each of which are hereby incorporated by reference in their entireties.

Without wishing to be bound by theory, the addition of a shell may reduce the effect of surface defects on the semiconductor nanocrystal core which can result in traps, or holes, for electrons or other non-radiative energy loss mechanisms that degrade the electrical and optical properties of the core, and either dissipate the energy of an absorbed photon or at least affect the wavelength of the fluorescence emission slightly, resulting in broadening of the emission band. An insulating layer at the surface of the semiconductor nanocrystal core can provide an atomically abrupt jump in the chemical potential at the interface that eliminates energy states that can serve as traps for the electrons and holes resulting in a higher efficiency luminescence. It should be understood that the actual fluorescence wavelength for a particular semiconductor nanocrystal core may depend upon the size of the core as well as its composition. Thus, the emission wavelengths described above are merely approximations, and nanocrystal cores of the various compositions described above may actually emit at longer or shorter wavelengths depending upon their size.

Suitable core and shell precursors useful for preparing semiconductor cores are known in the art and can include group 2 elements, group 12 elements, group 13 elements, group 14 elements, group 15 elements, group 16 elements, and salt forms thereof. For example, a first precursor may include metal salt ($M^+X^-$) including a metal atom ($M^+$) such as, for example, Zn, Cd, Hg, Mg, Ca, Sr, Ba, Ga, Al, Pb, Ge, Si, or in salts and a counter ion ($X^-$), or organometallic species such as, for example, dialkyl metal complexes. In such embodiments, first precursors can include zinc salts, such as zinc carboxylate salts, including zinc acetate, zinc oleate, and zinc stearate, and the like, as well as zinc chloride, and organometallic precursors, such as diethyl zinc, and mixtures thereof. In other embodiments, suitable a first precursor can include zinc phosphonates, zinc phosphinic acids, cadmium phosphonates, cadmium phosphinic acids, and mixtures thereof. In still other embodiments, a first precursor can include cadmium salts, such as cadmium carboxylate salts, including cadmium acetate, cadmium oleate, and cadmium stearate, and the like, as well as cadmium nitrate, cadmium oxide, and organometallic precursors, such as dimethyl cadmium, and mixtures thereof.

A second precursor may include a non-metal atom, which may be provided as an ionic or neutral non-metal species. In some embodiments, a second precursor may include one or more of elemental sulfur, elemental phosphorous, elemental selenium, or elemental tellurium precursors, or in other embodiments, a second precursor may include one or more complexes of, for example, sulfur, selenium, or tellurium with chalcogen sources such as TOP to produce TOPS, TOPSe or TOPTe, or bis(trimethylsilyl) to produce $TMS_2S$, $TMS_2Se$, $TMS_3P$, $TMS_3AS$, or $TMS_2Te$. In still other embodiments, second precursors can include, but are not limited to, oleylamine sulfide, oleylamine selenide, oleylamine telluride, decylamine sulfide, decylamine selenide, decylamine telluride, octadecene sulfide, octadecene selenide, octadecene telluride, and mixtures thereof. The selection of suitable precursors for the preparation of various core and core/shell nanoparticles is within the purview of those of ordinary skill in the art.

A typical single-color preparation of nanocrystals includes crystals that are preferably of substantially identical size and shape, and in some embodiments, the nanocrystals of embodiments can be roughly spherical. In other embodiments, the nanocrystals can be of any of numerous non-spherical shapes. For example, nanoparticles can be synthesized in a variety of shapes including, but not limited to, spheres, rods, discs, pyramid or pyramid like, nanorings, nanoshells, tetrapods, nanowires, and so on. Without wishing to be bound by theory, nanoparticles of different morphologies can have distinctive properties such as spatial distribution of the surface charge, orientation dependence of polarization of the incident light wave, and spatial extent of the electric field, and these distinctive properties may provide nanoparticles that are useful for particular purposes. In certain embodiments, the non-spherical nanocrystals may be useful based on their emission color.

The nanocrystals of various embodiments can be of any size. For example, nanocrystals useful in embodiments may have a diameter of form about 1 nm to about 100 nm, from about 1 to about 50 nm, and from about 1 to about 25 nm. More specific nanocrystals of useful in embodiments can include, but are not limited to, those nanocrystals having a diameter of from about 0.5 nm to about 5 nm, about 1 nm to about 50 nm, about 2 nm to about 50 nm, about 1 nm to about 20 nm, about 2 nm to about 20 nm, or from about 2 to about 10 nm. For example, in particular embodiments, nanocrystals may have a diameter of, about 0.5 nm, about 1 nm, about 2 nm, about 3 nm, about 4 nm, about 5 nm, about 6 nm, about 7 nm, about 8 nm, about 9 nm, about 10 nm, about 11 nm, about 12 nm, about 13 nm, about 14 nm, about 15 nm, about 16 nm, about 17 nm, about 18 nm, about 19 nm, about 20 nm, about 25 nm, about 30 nm, about 35 nm, about 40 nm, about 45 nm, about 50 nm, and the like and a diameter between any two values listed above. For a nanocrystal that is not substantially spherical, e.g., rod-shaped, the diameter at its smallest dimension may be from about 1 to about 100 nm, or from about 1 nm to about 50 nm or 1 nm to about 25 nm.

The relationship between size and fluorescence wavelength of nanocrystals is well known, and in general, the nanocrystals of embodiments can be sized to provide fluorescence in the UV, visible, or infrared portions of the electromagnetic spectrum, because this range is convenient for use in monitoring biological and biochemical events in relevant media. For example, in some embodiments, a CdSe nanocrystal having a diameter of about 3 nm may emit at a wavelength of about 525 nm, and in other embodiments, a ZnTe nanocrystal having a diameter of about 6 nm to about 8 nm may emit at a wavelength of about 525 nm. In still other embodiments, InP or InAs nanocrystals having a smaller diameter may emit at the same wavelength. In such embodiments, a ZnTe nanocrystal having generally larger diameters may have a larger absorption cross-section and produce brighter fluorescence. Thus, larger ZnTe nanocrystals may be preferred in particular embodiments. In other embodiments, a smaller nanocrystal may be necessary to, for example, achieve an appropriate hydrodynamic radius and maximize renal clearance for in vivo use, and the CdSe, InP, or InAs nanocrystals may be preferred.

In various embodiments, a significant proportion of the nanocrystals used in a particular application may be the same substantially size. For example, in some embodiments, at least about 60%, at least about 70%, at least about 80%, at least about 90%, at least about 95%, or about 100% of the nanocrystals can be substantially the same size. One of ordinary skill in the art will realize that particular sizes of nanocrystals, such as of semiconductor nanocrystals, are generally obtained as particle size distributions. The variance in diameter or size dispersity of populations of nanocrystal can be described as the root mean square ("rms"), where the smallest major axis may generally be used as the diameter for non-spherical particles. The root mean square of the nanocrystal populations used in embodiments can be less than about 30% rms, less than about 20% rms, or less than about 10% rms and in certain embodiments, less than about 9% rms, less than about 8% rms, less than about 7% rms, less than about 6% rms, less than about 5% rms, or a percentage between any two values listed. Such a collection of particles may sometimes referred to as being "monodisperse."

The quantum yield for the nanocrystals of various embodiments can be greater than about 10%, greater than about 20%, greater than about 30%, greater than about 40%, greater than about 50%, greater than about 60%, greater than about 70%, greater than about 80%, greater than about 90%, and ranges between any two of these values, and in particular embodiments, the quantum yield can be greater than about 30%, greater than about 50% or greater than about 70%. In some embodiments, a core nanocrystal can be less than about 10 nm in diameter, or less than about 7 nm in diameter, or less than about 5 nm in diameter.

It is well known that the color (emitted light) of the semiconductor nanocrystal can be "tuned" by varying the size and composition of the nanocrystal. Nanocrystals can absorb a wide spectrum of wavelengths, and emit a narrow wavelength of light. The excitation and emission wavelengths are typically different, and non-overlapping. The nanoparticles of a monodisperse population may be characterized in that they produce a fluorescence emission having a relatively narrow wavelength band. Examples of emission widths (full-width at half-maximum of the emission band, FWHM) useful in embodiments include less than about 200 nm, less than about 175 nm, less than about 150 nm, less than about 125 nm, less than about 100 nm, less than about 75 nm, less than about 60 nm, less than about 50 nm, less than about 40 nm, less than about 30 nm, less than about 20 nm, and less than about 10 nm. In particular embodiments, the FRHM can from about 20 nm to about 50 nm or from about 30 nm to about 35 nm.

In some embodiments, the emitted light can have a symmetrical emission of wavelengths. The emission maxima can be at any wavelength from about 200 nm to about 2,000 nm. Examples of emission maxima useful in embodiments can include, but are not limited to, about 200 nm, about 400 nm, about 600 nm, about 800 nm, about 1,000 nm, about 1,200 nm, about 1,400 nm, about 1,600 nm, about 1,800 nm, about 2,000 nm, and ranges between any two of these values. The fluorescence of a monodisperse population of nanocrystals can be characterized by the wavelength of light emitted when irradiated, and the emission maximum for a particular species of can be selected by the skilled artisan to provide a nanocrystals of any color. In various embodiments, the spectral range of a monodisperse population of nanocrystals encompassed by embodiments can be from about 370 nm to about 1200 nm, about 370 nm to about 900 nm, or from about 470 nm to about 800 nm, and in certain embodiments, nanocrystals, about 460 nm, about 525 nm, about 565 nm, about 585 nm, about 605 nm, about 625 nm, about 655 nm, about 705 nm, or about 800 nm.

The solvent used in various embodiments may vary. For example, suitable solvents can include, but are not limited to, hydrocarbons, amines, phosphines, carboxylic acids, phosphine oxides, alkylphosphonic acids, and mixtures thereof, and in more specific embodiments, solvents include, octadecene, TOPO, TOP, decylamine, octadecane, dioctylamine, tributylphosphine, oleylamine, oleic acid, and mixtures thereof. In certain embodiments, the core or shell precursor may be in a solution with octadecene, TOPO, or TOP as the solvent.

In various embodiments, the reaction mixture may be heated to a temperature sufficient to form of a core or core/shell nanocrystal, and the step of heating can be carried out for any period of time. For example, in some embodiments, the temperature can be from about 200° C. to about 350° C. However, higher or lower temperatures may be appropriate for a particular reaction involving specific precursors and/or multi-functional ligands. The time period may additionally vary based on the precursors and/or multi-functional surface ligands used and in some embodiments, may be from about 30 minutes to about 48 hours. In other embodiments, the time period for heating may be up to about 5 hours, up to about 6 hours, or up to about 12 hours, and in still other embodiments, the time period may be from about 15 minutes to about 4 hours, or from about 30 minutes to about 2 hours. Of course, the time periods of embodiments include any time between the time periods provided above; thus, the time period of various embodiments may be for example, about 45 minutes, or about 1, 1.25, 1.5, 1.75, 2, 2.25, 2.5, 2.75, 3, 3.25, 3.5, 3.75, or 4 hours and so on.

In certain embodiments, the solution or mixture prepared as above can further include, for example, a reaction promoter and additional solvents and/or ligands. For example, a reaction promoter can be added to adjust the oxidation state of one or both of the precursors if the oxidation states of the two precursors would need to be adjusted for reaction to occur. Thus, in some embodiments, nanoparticles prepared according to the methods of this disclosure may have portions of the surface covered by multi-functional ligands described above and other portions of the surface covered by other ligands such as trialkylphosphines, trialkylphosphine oxides, trialkylamines, alkyl carboxylates, and alkyl phosphonic acids.

In other embodiments, the functional group (R) of a multi-functional ligand may be protected or masked and the methods of such embodiments may include the step of deprotecting or unmasking a functional group associated with the multi-functional ligand. For example, in some embodiments, a carboxylate ester may be deprotected to form a carboxylic acid, and in other embodiments, a free amino group may be unmasked by reduction of a cyano group. Protecting groups and methods for deprotecting or unmasking protected functional groups are well known in the art. For example, methods for attaching and removing various protecting groups are described in T. H. Greene, Protective Groups in Organic Synthesis ($2^{nd}$ ed. 1991), which is hereby incorporated by reference in its entirety.

In particular embodiments, the functional groups (R) present on the multi-functional ligands may provide a hydrophilic surface that imparts water dispersability on the coated nanoparticle. For example, in some embodiments, the presence of polar functional groups, such as a carboxylic acid, carboxamide such as a primary carboxamide, cyano, hydroxyl, thiol, primary, secondary, or tertiary amine, polar heterocyclic group such as imidazole or tetrazole, and the like, or combinations thereof on a solvent exposed surface of the nanoparticle may result in a particle that is water-dispersible. In such embodiments, nanoparticles prepared in the presence of multi-functional ligands having such polar functional groups may be water dispersible or water soluble immediately following synthesis, and such methods may not require ligand replacement to supply polar or hydrophilic functional groups on the solvent exposed surface of the nanoparticle.

In some embodiments, the method may include the step of crosslinking functional groups associated with the multi-functional ligands described above. A variety of cross-linking agents are known in the art and can be used in various embodiments. Accordingly, crosslinking may be carried out by any conventional method. For example, in some embodiments, crosslinking may be carried out by providing a crosslinking agent such as, for example, diaminoalkane such as 1,2-diaminoethane, 1,3-diaminopropane, 1,4-diaminobutane, or 1,6-diaminohexane, an amino acid, a carbodiimide, or a hydroxymethyl phosphorus compound such as, for example, tris(hydroxymethyl)phosphine (THP) or tris(hydroxymethyl)phosphonium propionate (THPP) and the like, which can react with one or more functional groups associated with one or more multi-functional ligand. In other embodiments, combinations of two or more crosslinking agents may be used to crosslink functional groups of the multi-functional ligands coating a nanoparticle where appropriate. Further examples of crosslinking agents and methods for forming a crosslinked nanoparticle coating with various reactive functional groups can be found in, for example, U.S. Pat. Nos. 7,198,847 and 7,205,048, which are hereby incorporated by reference in their entireties.

As will be recognized by the skilled artisan, the number and types of functional groups that may be provided on the multi-functional ligands can provide substantial flexibility in choosing a method for crosslinking. Thus, a variety of methods may be used to crosslink the multi-functional ligands coating a nanoparticle that may not have been previously available. For example, in some embodiments, multi-functional ligands include one or more alkene functional groups may be crosslinked using olefin metathesis or Diels-Alder polymerization. In such embodiments, olefin metathesis may be carried out by any method and can involve addition of a catalyst such as, for example, nickel catalyst, Grubbs catalyst, or Shrock catalyst. In other embodiments, crosslinking may be effectuated by polymerizing the functional groups of multi-functional ligands. For example, in some embodiments, multi-functional ligands including alkyne functional groups may be polymerized to from polyacetylene, and in other embodiments, vinyl alcohols may be polymerized to form polyvinyl alcohols to crosslink the multi-functional ligands. In still other embodiments, crosslinking may be carried out by atom transfer radical polymerization (ATRP), nitroxide-mediated polymerization (NMP), or reversible addition-fragmentation chain transfer (RAFT) polymerization. For example, in certain embodiments, RAFT polymerization may be carried out using multi-functional ligands having functional groups such as dithioester, dithiocarbamate, trithiocarbonate, xanthate or combinations thereof. Such polymerization reactions are well known in the art and can be carried out by any appropriate method. In still other embodiments, different functional groups on different multi-functional ligands and/or on the same multi-functional ligand may be polymerized to crosslink the multi-functional ligands. For example, in certain embodiments, a coating including multi-functional ligands having ester functional groups and multi-functional ligands having carboxylate functional groups may be polymerized with multi-functional ligands having amine functional groups to create polyamine crosslinking.

In yet other embodiments, the functional group may provide transformable functionality. For example, in particular embodiments, a functional group associated with some multi-functional ligands may initially impart hydrophobicity on the nanoparticle but a subsequent reaction with the functional group may render the nanoparticle substantially water dispersible or water soluble. Nanoparticle having initially hydrophobic functional groups that may be modified in subsequent reactions to become hydrophilic may be useful in a number of embodiments. For example, certain embodiments include methods including the steps of dispersing an initially hydrophobic nanoparticle in an organic solvent and crosslinking the multi-functional ligands associated with the nanoparticle. In such embodiments, any crosslinking agent known in the art that is active in an organic solvent or that may decompose or be less active in water or an aqueous solution may be used. After crosslinking, such methods may include the step of modifying the functional group to become more hydrophilic allowing the nanoparticle having a crosslinked coating to be water dispersible or water soluble.

In other embodiments, the reactive functional group present on a multi-functional surface ligand can be used to connect a cargo molecule to the coated nanoparticle. The term "cargo molecule" may refer to any molecule attached to coated nanoparticle which may allow the nanoparticle to achieve a specific purpose. In certain embodiments, the cargo molecules may bind to a specific "target" molecule. For example, in some embodiments, the cargo molecule may be a biomolecule such as, for example, peptide, nucleotide, oligonucleotide, lipid, biotin, avidin, ConA, lectin, antibodies, and/or small molecules such as sugars, drugs, and ligands, attached to a functional group on multi-functional ligands attached to a nanoparticle. In other embodiments, the cargo molecule can be a DNA or RNA, or other nucleic acid or nucleic acid analog. In still other embodiments, the cargo molecule can be a protein, such as an enzyme, receptor, or affinity molecule such as monoclonal and polyclonal antibodies, and in other embodiments, the cargo molecule may be a biomolecule such as an oligosaccharide, a lipid, or the like.

Suitable cargo molecules are well known in the art and are sometimes disclosed as 'affinity molecules' because such cargo molecules have an affinity for and interact with a particular target molecule, which can involve covalent, non-covalent, hydrophobic, hydrophilic, electrostatic, van der Waals, magnetic, or other interactions. Specific affinity molecules can be selected based on their physical, chemical or biological properties including, but not limited to, their ability to form a covalent and non-covalent association with, for example, signaling molecules, prokaryotic or eukaryotic cells, viruses, subcellular organelles and any other biological compounds. In other embodiments, affinity molecules may be selected based on properties such as the ability to affect a biological process, cell cycle, blood coagulation, cell death, transcription, translation, signal transduction, DNA damage or cleavage, production of radicals, scavenging radicals, the ability to alter the structure of a biological compound, crosslinking, proteolytic cleavage, and radical damage. In some embodiments, the affinity molecule associated with a nanoparticle can be naturally occurring, and in other embodiments, the affinity molecule can be chemically synthesized.

Nanoparticles having cargo molecules attached to an outer surface have numerous uses such as, for example, tracking molecules or cells by monitoring or observing the fluorescence associated with the nanocrystal that is bound to a bioactive cargo molecule in a living cell or identifying immobilized bioactive molecules on for example a agar, agarose, acylamide gel, before or after electrophoresis or during chromatography by allowing the cargo molecule to associated with the immobilized bioactive molecule and monitoring or observing the fluorescence associated with the nanocrystal.

Methods for attaching such cargo molecules to a reactive functional group are well known in the art, and any conventional method for attaching a cargo molecule to ligands associated with a coated nanocrystal may be used in embodiments of the invention. For example, in some embodiments, a cargo molecule may by attached to a functional group of a multi-functional ligand of a coated nanoparticle by forming an amide bond between a carboxylate on the cargo molecule or an amine on the multi-functional ligand, or vice versa. In some exemplary embodiments, nanoparticles having multi-functional ligands with amine functional groups can be reacted with an activated PEG-COOH moiety. Examples of various common cargo molecules and methods for attaching cargo molecules are described in U.S. Pat. No. 6,423,551, which is hereby incorporated by reference in its entirety.

In other embodiments, the flexibility of the number and type of functional groups that may be provided on the multi-functional ligands described herein may allow for the attachment of cargo molecules using methods that were not previously available. For example, in some embodiments, a cargo molecule may be attached to a nanoparticle having a coating including multi-functional ligands by "click" chemistry. In such embodiments, a cargo molecule may be linked to a nanoparticle having multi-functional ligands with alkyne functional groups by reacting the alkyne with an azide on the cargo molecule, or vice versa, in the presence of an appropriate catalyst to for a triazole linkage. Various alkynes and azides containing functional groups may be provide on the multi-functional ligands that can result in triazoles having various substituents. In other embodiments, a cargo molecule may be attached to a nanoparticle having multi-functional ligands with succinimidyl ester functional groups by reacting the succinimidyl ester with a primary amine (—$NH_2$) on a cargo molecule or located on, for example, peptides, proteins, or amine-modified nucleic acids. Succinimidyl esters generally demonstrate very low reactivity with aromatic amines, alcohols, and phenols, including tyrosine and histidine. In still other embodiments, a cargo molecule may be attached to a nanoparticle having isothiocyanate functional groups by reacting the isothiocyantes with primary amines on cargo molecules, peptides, proteins, or amine-modified nucleic acids by a similar reaction. Without wishing to be bound by theory, succinimidyl esters may be preferred over other amine reactive reagents, such as isothiocyanates, because the amide bonds formed in the reaction are stable, and in fact, may be as stable as peptide bonds. In yet other embodiments, cargo molecules may be attached to nanoparticles having multi-functional ligands with alkynes by reacting the alkynes with a moiety having at least one azide and, for example, at least one succinimidyl ester. A primary amine on the cargo molecule may then be reacted with the succinimidyl ester to effectuate cargo molecule binding. It is within the purview of the skilled artisan to choose appropriate functional groups, catalysts, reagents and the like on multi-functional ligands and cargo molecules to allow cargo binding.

In further embodiments, reactive functional groups may provide a site of attachment to a peptide or dipeptide. Various peptides and dipeptides may be attached reactive functional groups and such peptides and dipeptides may be composed of natural or unnatural amino acids, or combinations thereof. In particular embodiments, peptides or dipeptides attached to a reactive functional group may include at least one polar residue such as, for example, a histidine, a cysteine or the like. In more specific embodiment, the peptides or dipeptides attached to a reactive functional group may be carnosine, which contains beta-alanine and histidine, His-Leu, Gly-His, His-Lys, His-Glu, His-Ala, His-His, His-Cys, Cys-His, His-Ile, His-Val, and other dipeptides where His or Cys is paired with any of the common alpha-amino acids. In some embodiments, a tripeptide such as, for example, Gly-His-Gly, His-Gly-His, and the like may be attached to the reactive functional group.

Further embodiments are directed nanoparticles prepared by the methods described above that include the multi-functional ligands of Formulae I through XXXVII, as well as any nanoparticles having a coating including the multi-functional ligands embodied by Formulae I through XXXVII. Still further embodiments, are directed to the multi-functional ligands of Formulae I through XXXVII and methods for preparing these multi-functional ligands.

Other embodiments are directed to methods for using the coated nanoparticles described for, for example, detecting a target molecule in a sample. In such embodiments, the method may include providing a sample which may or may not contain a target molecule, contacting the sample with a nanoparticle at least including a core or core/shell nanoparticle nanocrystal capable of emitting fluorescence after excitation, one or more multi-functional ligands, and a conjugated cargo molecule having an affinity for the target molecule to form a sample solution. The method may further include the steps of allowing a complex to form between the cargo molecule or affinity molecule and the target molecule if present in the sample to form a target/nanoparticle complex, exposing sample solution to a wavelength of light suitable for exciting the nanocrystal, and detecting light emitted from the nanocrystal where detection of the luminescence peak is indicative of the presence of the target molecule. In other embodiments, the method can further include the step of quantitating the amount of the target molecule by measuring the intensity of the luminescence emitted from the sample solution after excitation.

Nanoparticles conjugated to cargo or affinity molecules, can be used to detect the presence and/or quantity of any biological and chemical target molecule or compound in such embodiments, and in some embodiments, such conjugated nanoparticles can be used to elucidate interactions in biological systems, biological processes, alterations in biological processes, or alterations in the structure of biological compounds. The interaction of the affinity molecule and the biological or chemical target molecule can involve any type of interaction. For example, in some embodiments, the affinity molecule can serve as the second member of the binding pair that interacts with a specific biological target, and detecting the nanoparticles associated with the affinity molecule may be useful for observing biological processes or reactions, or altering biological molecules or processes.

In some embodiments, a nanoparticle may be conjugated to a molecule or species for detection by means of Förster Resonance Energy Transfer (FRET), and in particular embodiments, the FRET efficiency for the nanoparticles described herein can be at least 25%, at least 40%, at least 50%, at least 60%, at least 70%, at least 80%, at least 90%, or greater up to 100%. FRET is the basis for various fluorescence measuring techniques that allow detection of the close proximity of two appropriately labeled molecules or species. Briefly, FRET involves a donor label that non-radiatively transfers energy to a second acceptor label, which can be a fluorophore and may emit a photon following energy transfer and may additionally act as a quencher. Donor-acceptor pairs are selected such that there is overlap between the emission spectrum of the donor and excitation spectrum of the acceptor. FRET efficiency depends on donor-acceptor distance (r) as $1/r^6$. The distance where FRET efficiency is 50% is termed $R_0$, also known as the Förster distance and is unique for each donor-acceptor combination and may be about 5 to about 10 nm. In biological applications, FRET can provide an on-off type signal, indicating when the donor and acceptor are within $R_0$ of each other. Additional factors affecting FRET efficiency include the quantum yield of the donor, the extinction coefficient of the acceptor, and the degree of spectral overlap between donor and acceptor. Without wishing to be bound by theory, nanoparticles may be advantageous because their emission may be size-tuned to improve spectral overlap with an acceptor or quencher. Additionally, nanoparticles can have high quantum yield and are less susceptible to photobleaching other than FRET donors, and the higher extinction coefficient of nanoparticles may also be beneficial for FRET-based acceptor emission because the emission may be more intense than it would be by direct excitation. FRET efficiency and signal detection is described in D. W. Piston and G. J. Kremers, *Trends Biochem. Sci.* 32:407 (2007), and nanoparticles used for FRET detection in biological systems have been described, for example, in Willard et al., 2001*, Nano. Lett.* 1:469; Patolsky F et al., 2003, *J. Am. Chem. Soc.* 125:13918; Medintz I. L. et al., 2003, *Nat. Mater.* 2:630; Zhang C. Y., et al., 2005, *Nat. Matter.* 4:826, the disclosures of each of which are hereby incorporated by reference in their entireties.

EXAMPLES

Although the present invention has been described in considerable detail with reference to certain preferred embodiments thereof, other versions are possible. Therefore the spirit and scope of the appended claims should not be limited to the description and the preferred versions contained within this specification. Various aspects of the present invention will be illustrated with reference to the following non-limiting examples.

Example 1

General Core Reaction Procedure

Into a 25 mL 3 neck flask with 14/20 joints, 1.575 g of >99% tri-n-octylphosphine oxide (TOPO) was weighed. To this, 1-1000 micromoles of a bi-functional phosphonate ligand was added. A stir bar was added to this flask. The flask was connected to an inert atmosphere manifold and evacuated thoroughly, then refilled with nitrogen. A solution of a suitable cadmium salt in tri-n-octylphosphine (TOP) was prepared with a concentration of 0.5 mol Cd per kg solution. A desired amount of cadmium as required for growth of nanoparticles of a desired size was extracted from this solution, diluted with 0.9 mL of additional TOP, and added to the flask. The flask was stirred and heated to ~200-350° C. under nitrogen flow. A 1 molar solution of selenium in TOP was prepared and a desired amount as required for growth of nanoparticles of a desired size was added to the solution, optionally with addition of a reaction promoter to achieve desired levels of particle nucleation. One minute after the reaction was initiated by adding these final reagents, a 20 microliter sample was removed from the reaction, mixed with 5 mL of hexane, and an emission spectrum was collected. This aliquot removal and measurement process was repeated after 2, 3, 4, 5, 6, 7, 8, 10, 12, and 14 minutes. After 14 minutes, the reaction was rapidly cooled and the products were isolated by methods understood in the art.

Example 2

Control Core Reaction with tetradecylphosphonic acid [TDPA]

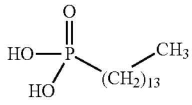

TDPA

The core reaction using TDPA as the phosphonate ligand was demonstrated as a control reaction. This reaction proceeded with an initial emission reading at 1 minute of ~490 nm and progressing to a final emission reading of ~544 nm at 14 minutes. The full width at half maximum intensity (FWHM) never got above 28 nm. The final "growth solution" of the cores was yellow/light orange in appearance by eye. The aliquotted samples of this reaction remained dispersed and clear solutions in hexane.

Example 3

Core Reaction with 11-methoxy-11-oxo-undecylphosphonic acid

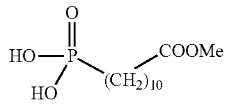

The reaction using 11-methoxy-11-oxo-undecylphosphonic acid as the phosphonate ligand proceeded with an initial emission reading at 1 minute was ~560 nm; this was redder than the final emission of the control reaction. The final emission of this reaction was ~610 nm. The FWHM of this reaction started at ~35 nm and steadily got more broad throughout the reaction for a final FWHM of ~50 nm.

The aliquotted samples were not soluble in hexane, and became almost instantly flocculated and settled to the bottom of the vials within minutes.

Example 4

Core Reaction with 6-ethoxy-6-oxohexylphosphonic acid

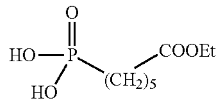

The core reaction using 6-ethoxy-6-oxohexylphosphonic acid as the phosphonate ligand had an initial emission reading at 1 minute of ~560 nm and a final emission reading of ~606 nm. The FWHM of this reaction started out at 1 minute at ~43 nm and narrowed to a final FWHM of ~40.5 nm.

The solubility of the aliquotted samples was observed. The hexane samples were immediately cloudy, however the flocculation did not settle to the bottom of the vials. Six of the aliquotted samples were centrifuged and the resulting clear, colorless supernatants were discarded. The pellets were soluble in toluene, dichloromethane ($CH_2Cl_2$), dimethylformamide (DMF), and methanol (MeOH). The pellets were not soluble in water, 50 mM borate buffer at pH=8.3 or hexane.

Particles synthesized in the presence of TDPA are soluble in hexane, toluene, $CH_2Cl_2$, DMF and hexane. The 6-ethoxy-6-oxohexylphosphonic acid itself is not soluble in hexane, and neither were the resulting particles from this reaction, suggesting that the ligand was indeed coating the nanoparticles—a suggestion which was confirmed with infrared and NMR spectroscopy indicating the expected ester functionality. Using a solvent system of toluene as the solubilizing solvent and hexane as a precipitating solvent, a pellet can be formed along with a clear, colorless supernatant. The resulting pellet can be re-solubilized in toluene. This resulting toluene solution allowed an absorbance spectrum of these cores to be obtained.

These data suggest that quantum confined nanoparticles have been formed with 6-ethoxy-6-oxohexylphosphonic acid on the particle surface. The resulting core particles were taken further into a shell reaction.

Example 5

Shell Reaction Procedure using 6-ethoxy-6-oxohexylphosphonic acid

Core Precipitation

Three (3) mL of growth solution cores using 6-ethoxy-6-oxohexylphosphonic acid ligand (prepared according to the procedure of Example 4) was solubilized into 3 mL toluene in a 250 mL conical bottom centrifuge tube. A total of 135 mL of hexane was added to precipitate the cores. The tube was centrifuged at 3000 RPM for 5 min. The resulting clear, colorless supernatant was discarded and the pellet was dispersed into 3 mL of toluene.

Shell Reaction

Into a 25 mL 3 neck flask with 14/20 joints, 1.4 g of TOPO was weighed. To this, 1-1000 mg of 6-ethoxy-6-oxohexylphosphonic acid was added. A stir bar and 1.4 mL of TOP were added to the flask. The flask was connected to an inert atmosphere manifold and evacuated thoroughly, then refilled with nitrogen. 2.6 mL of the toluene solution of cores was added to the flask and the flask was warmed and evacuated to remove the toluene, then refilled with nitrogen. Approximately 1 mL of a suitably high-boiling amine was added to the flask and the flask was heated to 200-350° C. Solutions of suitable cadmium and zinc precursors in TOP were prepared with a concentration of 0.5 mol metal ion per kg of solution. A solution of 10% trimethylsilylsulfide in TOP by weight was prepared as well. The metal and sulfur precursor solutions were added slowly over the course of several hours to minimize additional nanoparticle nucleation. Sufficient shell precursors were added to grow a shell of a desired thickness, as can be calculated by one of ordinary skill in the art. When the desired shell thickness was reached, the reaction was cooled and the core/shell nanoparticles were isolated by conventional means.

Aliquots taken during the reaction permitted monitoring of the progress of the shell reaction. It was observed that the emission maximum after heating but before addition of shell precursors was very similar to that of the initial cores (~600 nm), suggesting that the bi-functional phosphonate was sufficiently strongly coordinated to the nanoparticle surface to minimize Ostwald ripening. A red-shift during shell precursor addition of ~50 nm was typical of a shell as deposited in a reaction employing TDPA, suggesting that the shell formed as expected. In addition, the nanoparticle solution became much more intensely emissive, as would be expected of successful deposition of an insulating shell. Infrared and NMR spectroscopy confirmed that the functionalized phosphonates were present on the nanoparticles.

What is claimed is:

1. A method for preparing a nanoparticle comprising:
admixing one or more first nanocrystal precursors and one or more multi-functional ligands of general Formula I:

$$(X)_n\text{-}(L\text{-}R)_y \qquad \text{I}$$

wherein:

each X is independently a nanocrystal binding center selected from phosphonic acid, phosphinic acid, phosphine, phosphine oxide, carboxylic acid, amine, imidazole, thiol, mercaptan, sulfonate, and selenate;

each L is independently a linker selected from a covalent bond, saturated or unsaturated aliphatic chain of from 2 to about 500 carbon atoms, polyethylene glycol having from 2 to about 500 carbon atoms, polyester having from 2 to about 100 carbon atoms, and a combination thereof;

each R independently is hydrogen or a group selected from halide, hydroxyl, carboxylic acid, carboxylic acid ester, ester, succinimidyl ester, alkyl ester, benzyl ester, aldehyde, amine including primary, secondary, or tertiary amine, polyamine, thiol, isocyanate, cycloalkyl, heterocycloalkyl, benzyl, aryl, heteroaryl, alkaryl, heterocycle, imidazole, pyridone, tetrazole, cyano, cyanoalkyl, thiol, thioalkyl, alkoxy, thioalkoxy, ether, alkyl ether, thioether, polyether, carbamates, azide, amide, silyl, silyl ester, a polyethylene glycol moiety having from 2 to about 500 carbon atoms, a polyester having from 2 to about 20 carbon atoms, and combinations thereof, wherein at least one R comprises a hydrophilic or reactive functional group provided in a protected form; and y and n are independently 1 to 3;

in a solvent to form a mixture; and heating the mixture to prepare the nanoparticle.

2. The method of claim 1, wherein the solvent is selected from hydrocarbons, amines, phosphines, carboxylic acids, phosphine oxides, alkylphosphonic acids, and mixtures thereof.

3. The method of claim 1, further comprising adding one or more second nanocrystal precursors to the mixture after heating and continuing heating to produce core/shell nanoparticles.

4. The method of claim 1, further comprises admixing core nanocrystals, and the method results in producing core/shell nanoparticles.

5. The method of claim 1, wherein y is 1 and X is selected from phosphonic acid or carboxylic acid.

6. The method of claim 1, wherein y is 2 and X is phosphinic acid.

7. The method of claim 1, wherein L comprises an aliphatic chain selected from $C_4$-$C_{18}$ alkyl, $C_4$-$C_{18}$ alkenyl and $C_4$-$C_{18}$ alkynyl.

8. The method of claim 1, wherein L comprises $C_{11}$-$C_{16}$ alkyl.

9. The method of claim 1, wherein L is a polyethylene glycol (PEG) selected from PEG-2, PEG-4, PEG-6, PEG-8, PEG-12, PEG-20, and PEG-24.

10. The method of claim 1, wherein L comprises an aliphatic chain selected from $C_2$-$C_{10}$ alkyl, $C_2$-$C_{10}$ alkenyl, and $C_2$-$C_{10}$ alkynyl covalently attached to a polyethylene glycol or polyester.

11. The method of claim 1, wherein R comprises one or more functional groups selected from

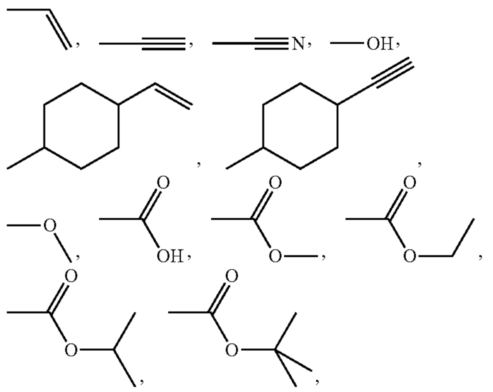

-continued

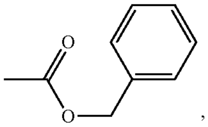
,
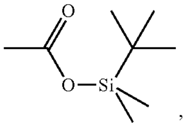
,
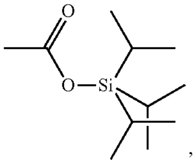
,
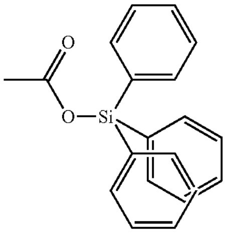
,
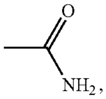
,
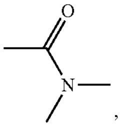
,
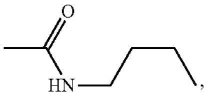
,
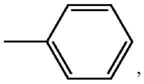
,
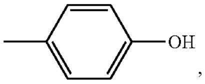
,
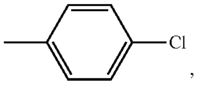
,
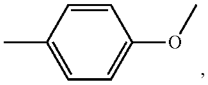
,
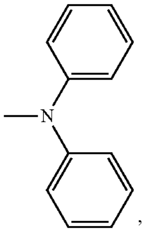
,
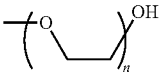
, and -continued

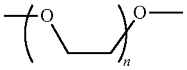

wherein each n is from 1 to 100.

12. The method of claim 1, wherein method further comprises crosslinking the functionalized ends in a subsequent crosslinking reaction.

13. The method of claim 1, wherein the method comprises a subsequent reaction at the functional group R to give a hydrophilic functional group and wherein the hydrophilic functional group is carboxylic acid, thiol, amine, hydroxyl or aldehyde.

14. The method of claim 1, wherein the carboxylic acid ester is selected from succinimidyl ester, alkyl ester, benzyl ester and silyl ester.

15. The method of claim 1, wherein when y is 1, R is not hydrogen and when y is 2 or 3, at least one R is not hydrogen.

16. The method of claim 1, wherein the protected functional group is selected from carboxylic acid ester, cyano, alkoxy, thioether, carbamate, azide and amide.

17. The method of claim 1, wherein the carboxylic acid ester is selected from succinimidyl ester, alkyl ester, benzyl ester and silyl ester.

18. The method of claim 1, wherein each R is a hydrophobic group.

* * * * *